United States Patent
Bhatnagar et al.

(10) Patent No.: US 10,593,319 B1
(45) Date of Patent: Mar. 17, 2020

(54) PARALLELIZATION OF INSTRUCTION STEPS

(71) Applicant: Amazon Technologies, Inc., Seattle, WA (US)

(72) Inventors: Eshan Bhatnagar, Santa Clara, CA (US); Andrew Carl Pierce, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/634,136

(22) Filed: Jun. 27, 2017

(51) Int. Cl.
| | |
|---|---|
| *G06Q 10/06* | (2012.01) |
| *A23L 5/00* | (2016.01) |
| *G09B 19/00* | (2006.01) |
| *G10L 13/08* | (2013.01) |
| *G10L 15/22* | (2006.01) |
| *G09B 5/06* | (2006.01) |

(52) U.S. Cl.
CPC .............. *G10L 13/08* (2013.01); *A23L 5/00* (2016.08); *G06Q 10/06316* (2013.01); *G09B 5/06* (2013.01); *G09B 19/0092* (2013.01); *G10L 15/22* (2013.01); *G09B 19/00* (2013.01); *G10L 2015/223* (2013.01)

(58) Field of Classification Search
CPC .. G06Q 10/06316; A23L 5/00; G09B 19/0092
See application file for complete search history.

(56) References Cited

U.S. PATENT DOCUMENTS

| | | | |
|---|---|---|---|
| 6,907,308 B1 * | 6/2005 | Bartlett | G05B 19/41865 700/121 |
| 8,145,854 B1 * | 3/2012 | Lee | G06Q 10/06316 711/154 |
| 9,797,873 B1 * | 10/2017 | Feller | G16H 20/60 |
| 9,824,152 B1 * | 11/2017 | Feller | G06F 16/9535 |
| 2007/0030270 A1 * | 2/2007 | Rosenberg | G06Q 10/10 345/440 |

(Continued)

OTHER PUBLICATIONS

IBM Chef Watson with bon appetit, "Ready to do some cognitive cooking?: Discover and create unique dishes with Chef Watson and share with you friends!" (https://www.ibmchefwatson.com/community).

*Primary Examiner* — Bryan S Blankenagel
(74) *Attorney, Agent, or Firm* — Pierce Atwood LLP

(57) ABSTRACT

Described are techniques for providing steps of an instruction group in an order easily performable by a user operating a voice user interface. A system receives a command from a user to output an instruction group. The system obtains the instruction group and processes the instruction group to determine steps within the instruction group that may be performed in parallel by one or more users. Such determination may involve, for example, determining conditional words or phrases such as "meanwhile," "while you are," etc. within the instruction group; determining a number of users performing the instruction group; or determine a type of user performing the instruction group. Once the steps that may be performed in parallel are determined, the system generates a prompt to the user indicating the steps may be performed in parallel, and optionally requesting user instruction regarding an order in which the user wants to perform the steps.

25 Claims, 23 Drawing Sheets

(56) References Cited

U.S. PATENT DOCUMENTS

| | | | | |
|---|---|---|---|---|
| 2009/0125126 A1* | 5/2009 | Moore, Jr. | ........ | G05B 19/41865 700/29 |
| 2009/0259689 A1* | 10/2009 | Do | ................ | G09B 21/00 |
| 2013/0073079 A1* | 3/2013 | Ouchi | ................ | B25J 9/1656 700/245 |
| 2013/0183642 A1* | 7/2013 | Wan | ................ | G09B 19/0092 434/127 |
| 2013/0185646 A1* | 7/2013 | Wiggins | ................ | H04L 67/306 715/739 |
| 2014/0089299 A1* | 3/2014 | Kamei | ................ | G06Q 50/04 707/722 |
| 2017/0011649 A1* | 1/2017 | Lee | ................ | G09B 5/06 |
| 2017/0316488 A1* | 11/2017 | Kremen | ................ | G09B 5/06 |
| 2017/0344854 A1* | 11/2017 | Behringer | ................ | G06F 16/435 |
| 2018/0114285 A1* | 4/2018 | Coden | ................ | G06Q 30/0621 |

* cited by examiner

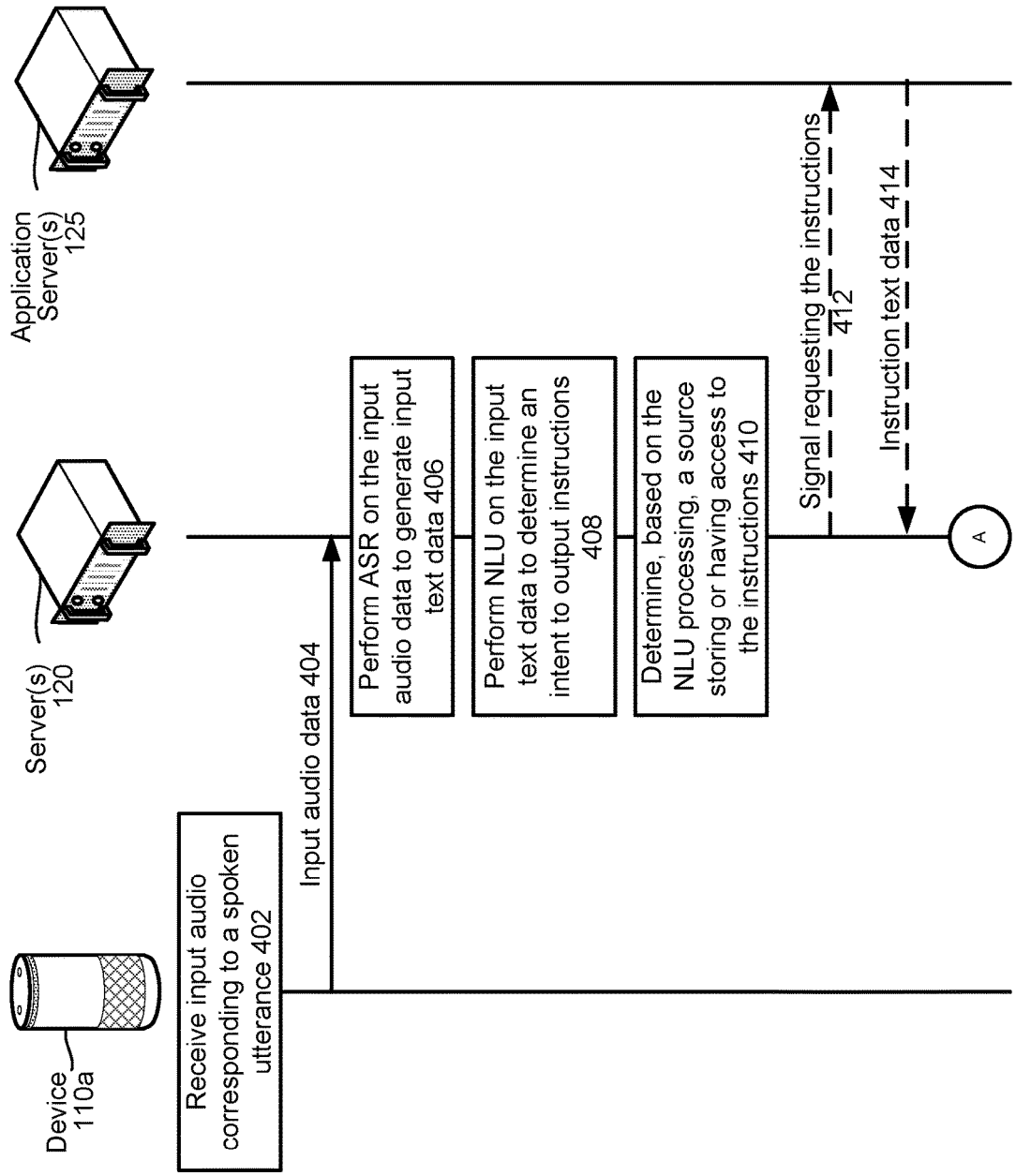

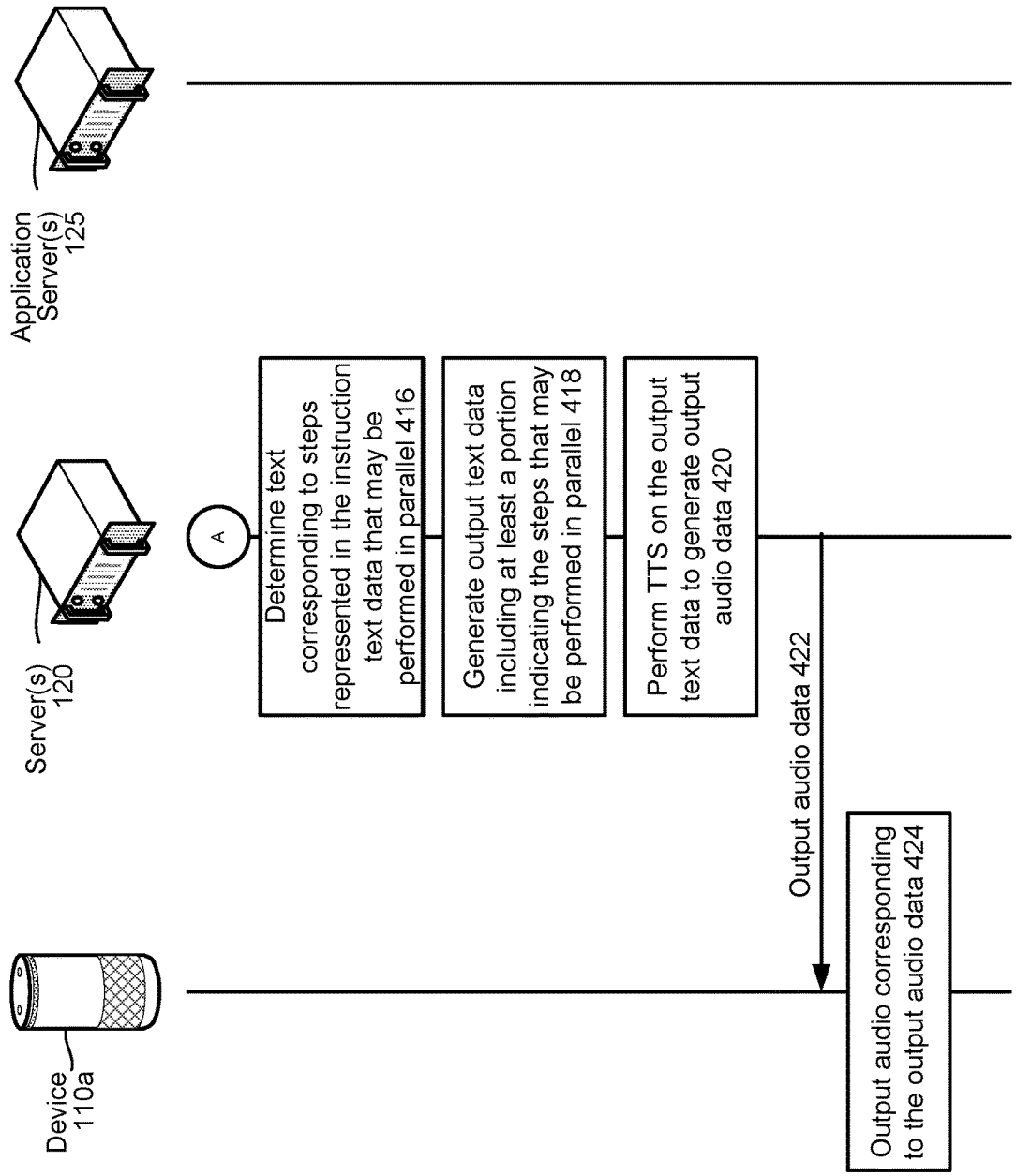

PARALLELIZATION OF INSTRUCTION STEPS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A and 4B are a signal flow diagram illustrating the processing performed with respect to a command requesting output of a list of instructions according to embodiments of the present disclosure.

DETAILED DESCRIPTION

Figure 1:
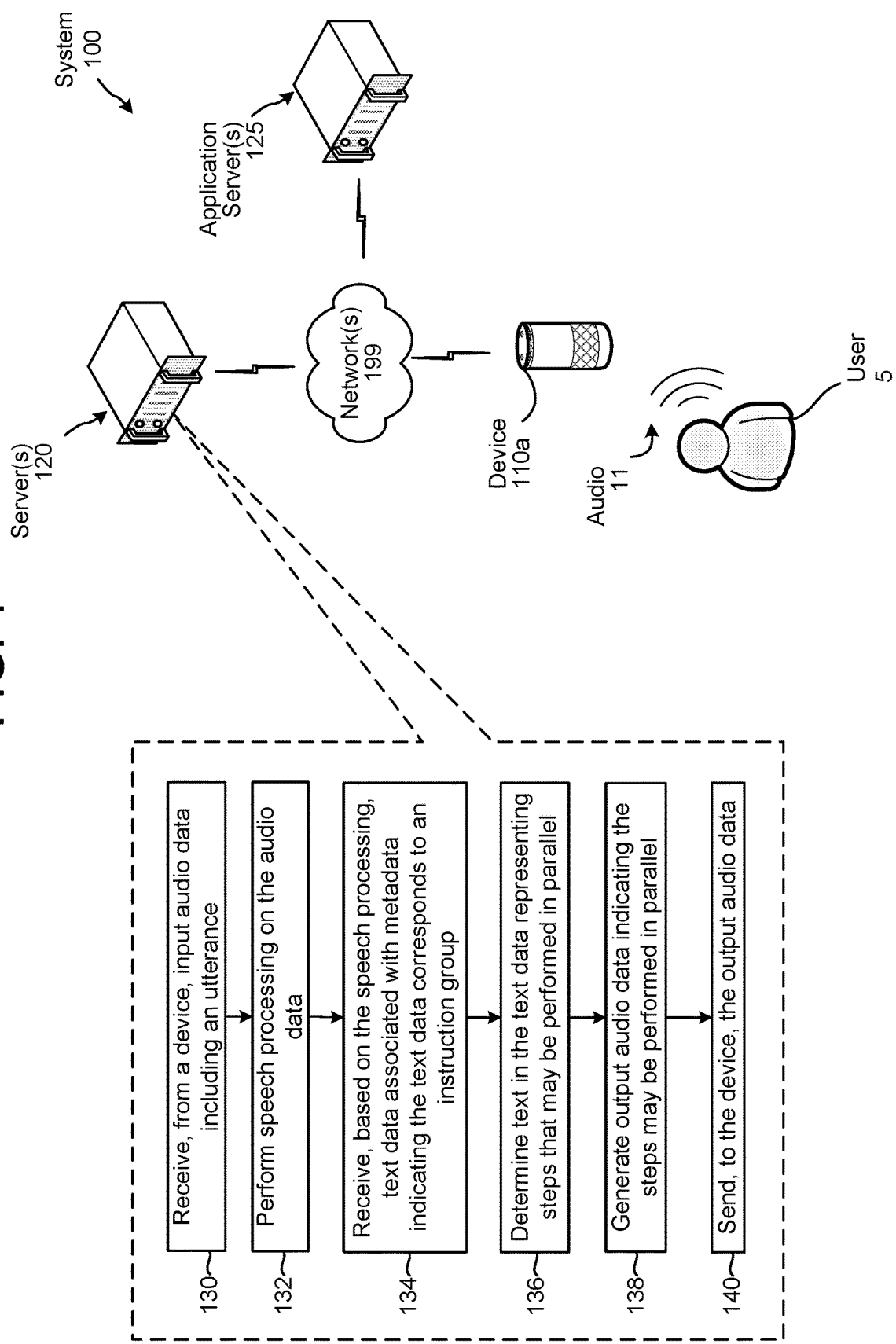
FIG. 1 illustrates a system configured to determine parallelizable steps of a list of instructions according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. Likewise, text-to-speech (TTS) is a field of computer science, artificial intelligence, and linguistics concerned with enabling computers to output synthesized speech. ASR, NLU, and TTS are often used together as part of a speech processing system.

When a user wishes to interact with a group of instructions (such as a recipe, product assembly instructions, or the like) using a computing system having a display, the user may access the instruction group using the computing system and the computing system may display text or graphics (e.g., via a webpage) related to the instruction group to a user so that the user can perform the individual instructions as laid out in the instruction group. Technology has progressed to the point where a user can interact with a computing system using speech. A computing system using a voice user interface (VUI), such as a user interface that receives input user speech and/or outputs audio data may interact with a group of instructions differently, for example audibly outputting steps of an instruction group to a user as the steps appear in the instruction group. That is, the computing system may divide text corresponding to steps of an instruction group into discrete segments, convert the segments into audio, and output the audio to a user in the order of the steps of the instruction group. The aforementioned technique is not always beneficial from a user perspective because the steps of an instruction group, despite a creator's best efforts, may not be written in a way conducive to a user performing the instruction group. For example, such regimented audio output of steps may reduce the ability for a user to parallelize steps, may prevent the user from receiving information about later steps until earlier steps are completed, or otherwise result in an undesirable user experience.

The present disclosure provides a system that can process information about steps of an instruction group in order to generate an output that results in the instructions being more easily performable by a user. For example, the system receives a command (which may be spoken) from a user to output an instruction group. The system obtains the instruction group and processes the instruction group to determine steps within the instruction group that may be performed in parallel by the user. Such determination may involve processes such as determining conditional words or phrases such as "meanwhile," "while you are," etc. within the instruction group; determining a number of users performing the instruction group; and/or determine a type of user performing the instruction group. Once the steps that may be performed in parallel are determined, the system may generate a prompt to the user indicating the steps may be performed in parallel, and optionally requesting user instruction regarding an order in which the user wants to perform the steps. Other various operations may be taken by the computing system to craft an output for a VUI that improves the experience for a user when the user is receiving information about and attempting to actually perform instructions in an instruction group.

FIG. 1 shows a system 100 capable of operating a voice user interface (VUI) with respect to an instruction group. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more devices 110a local to a user 5, one or more servers 120, and one or more application servers 125 connected across one or more networks 199. The server(s) 120 (which may be one or more different physical devices) may be capable of performing speech processing (e.g., ASR and NLU) as well as non-speech processing operations as described herein. A single server 120 may perform all speech processing or multiple servers 120 may combine to perform all speech processing.

As shown in FIG. 1, a device 110a may receive audio 11 including a spoken utterance of a user 5 via a microphone (or array of microphones) of the device 110. The device 110 generates input audio data corresponding to the audio 11, and sends the input audio data to the server(s) 120 for processing.

The server(s) 120 receives (130) the input audio data from the device 110. The server(s) 120 performs (132) speech processing on the input audio data. Based on the speech processing, the server(s) 120 receives (134) text data associated with metadata indicating the text data corresponds to a list of instructions. For example, if the utterance corresponds to "how do I cook chicken lasagna," the text data may correspond to a chicken lasagna recipe. The text data may be received from a first party (1P) application (e.g., one controlled or managed by the server(s) 120) or third party (3P) application (e.g., one managed by an application server(s) 125 in communication with the server(s) 120 but not controlled or managed by the server(s) 120). The server(s) 120 also determines (136) text in the text data representing steps of the list of instructions that may be performed in parallel. For example, a chicken lasagna recipe may include a step to boil noodles in water as well as a step to sauté chicken. In this example, the server(s) 120 may determine these steps may be performed in parallel because the chicken can be sautéed while the noodles boil. The text data may be processed to determine the text representing the steps that may be performed in parallel prior to being stored in a 1P storage. Alternatively, the text data may be processed at runtime. The server(s) 120 additionally generates (138) output audio data indicating the steps may be performed in parallel. The server(s) 120 sends (140) the output audio data to the device 110a or a different device indicated in a profile of the user 5 and determined proximate to the user 5. The device 110a or other device outputs audio corresponding to the output audio data to the user 5.

The audio indicating a first step may be performed in parallel with a second step (listed subsequent to the first step in a list of instructions) may be output immediately following output of audio corresponding to the first step. For example, for a chicken lasagna recipe, the first step may corresponding to boiling noodles and the second step may corresponding to sautéing chicken. According to this example, audio may be output as "you need to boil the noodles for five minutes, you may sauté the chicken while the noodles are boiling."

Figure 2:
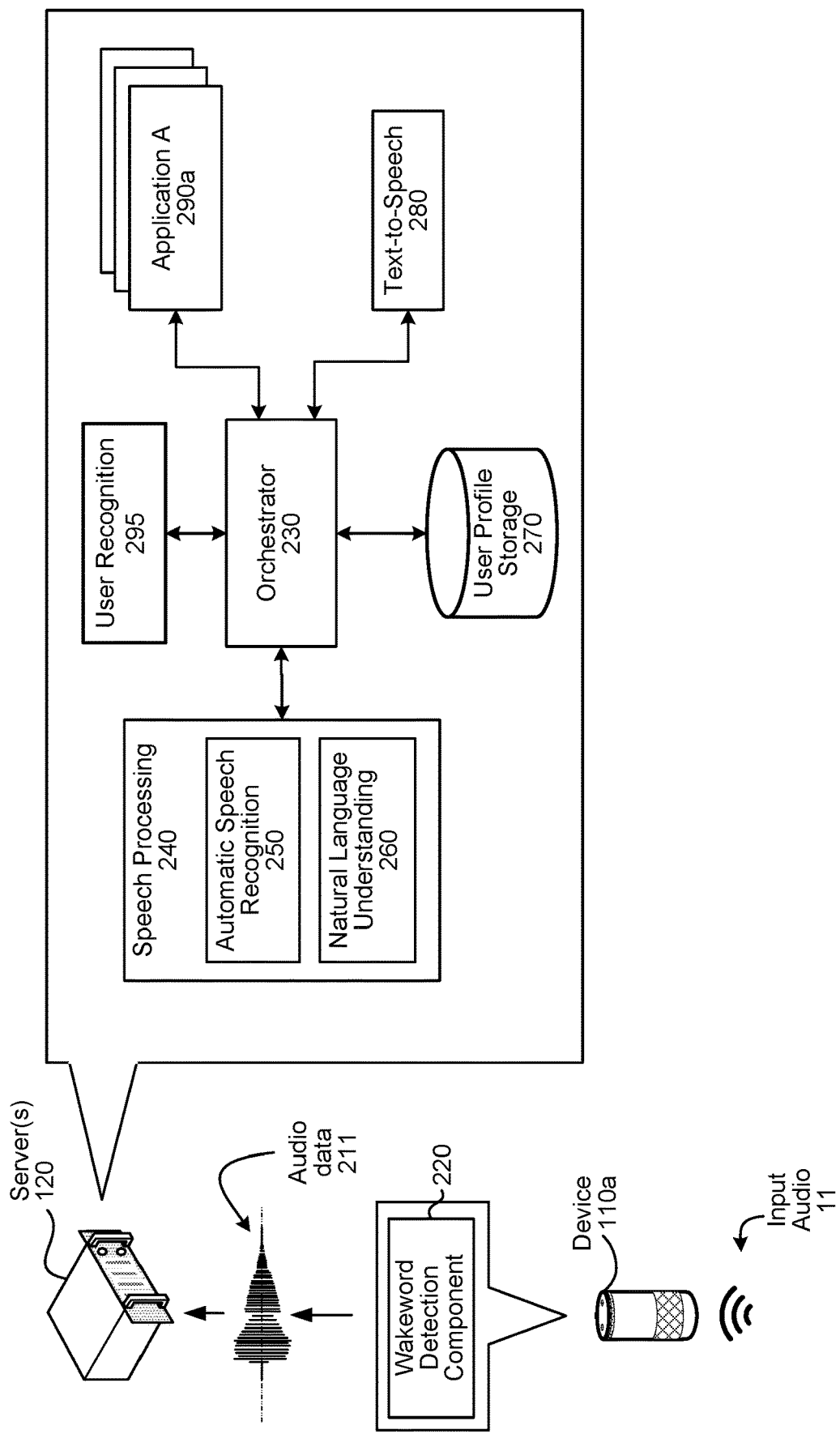
FIG. 2 is a diagram of components of a system according to embodiments of the present disclosure.

The system 100 may operate using various components as described in FIG. 2. The various components illustrated FIG. 2 may be located on a same or different physical devices. Communication between various components illustrated in FIG. 2 may occur directly or across a network(s) 199.

An audio capture component, such as a microphone or array of microphones of the device 110a or other device, captures the input audio 11 corresponding to a spoken utterance. The device 110a, using a wakeword detection component 220, processes audio data corresponding to the input audio 11 to determine if a keyword (e.g., a wakeword) is detected in the audio data. Following detection of a wakeword, the device 110a sends audio data 211, corresponding to the utterance, to a server(s) 120 for processing.

Upon receipt by the server(s) 120, the audio data 211 may be sent to an orchestrator component 230. The orchestrator component 230 may include memory and logic that enable the orchestrator component 230 to transmit various pieces and forms of data to various components of the system 100.

The orchestrator component 230 sends the audio data 111 to a speech processing component 240. An ASR component 250 of the speech processing component 240 transcribes the audio data 111 into text data representing words of speech contained in the audio data 111. The ASR component 250 interprets the spoken utterance based on a similarity between the spoken utterance and pre-established language models. For example, the ASR component 250 may compare the audio data 111 with models for sounds (e.g., subword units or phonemes) and sequences of sounds to identify words that match the sequence of sounds spoken in the utterance of the audio data 111.

Results of ASR processing (i.e., text data representing speech) are processed by an NLU component 260 of the speech processing component 240. The NLU component 260 attempts to make a semantic interpretation of the text data. That is, the NLU component 260 determines the meaning behind the text data based on the individual words in the text data and then implements that meaning. The NLU component 260 interprets a text string to derive an intent or a desired action from the user as well as the pertinent pieces of information in the text data that allow a device (e.g., the device 110a, the server(s) 120, the application server(s) 125, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

An NLU component 260 may include a recognizer that includes a named entity recognition (NER) component that is used to identify portions of text data that correspond to a named entity that may be recognizable by the system. A downstream process called named entity resolution actually links a text portion to an actual specific entity known to the system. To perform named entity resolution, the system may utilize gazetteer information stored in an entity library storage. The gazetteer information may be used for entity resolution, for example matching ASR results with different entities (e.g., song titles, contact names, etc.). Gazetteers may be linked to users (e.g., a particular gazetteer may be associated with a specific user's music collection), may be linked to certain domains (e.g., shopping), or may be organized in a variety of other ways. The NER component (or other component) may also determine whether a word refers to an entity that is not explicitly mentioned in the text data, for example "him," "her," "it" or other anaphora, exophora or the like.

Generally, the NLU component 260 takes text data (e.g., output from the ASR component 250) and attempts to make a semantic interpretation of the text represented in the text data. That is, the NLU component 260 determines the meaning behind the text based on the individual words and then implements that meaning. NLU processing interprets a text string to derive an intent or a desired action from the user as well as the pertinent pieces of information in the text that allow a device (e.g., the device 110) to complete that action. For example, if a spoken utterance is processed using the ASR component 250 and outputs the text "call mom," the NLU component 260 may determine that the user intended to activate a telephone in his/her device and to initiate a call with a contact matching the entity "mom," which may involve a downstream telephone application.

The NLU component 260 may process several textual interpretations that are output by the ASR component 250 and that relate to the same utterance. For example, if the ASR component 250 outputs N textual interpretations (e.g., as part of an N-best list), the NLU component 260 may process all N textual interpretations to obtain NLU results data 301.

The NLU component 260 may be configured to parse and tag to annotate text as part of NLU processing. For example, for the text "call mom," "call" may be tagged as a command to execute a phone call and "mom" may be tagged as a specific entity and target of the command. Moreover, the telephone number for the entity corresponding to "mom" stored in a contact list may be included in the annotated NLU results data 301. Further, the NLU component 260 may be used to provide answer data in response to queries, for example using a NLU knowledge base.

The NLU component 260 may be configured to determine a "domain" of the utterance so as to determine and narrow down which services offered by an endpoint device (e.g., the server(s) 120 or the device 110) may be relevant. For example, an endpoint device may offer services relating to interactions with a telephone service, a contact list service, a calendar/scheduling service, a music player service, etc. Words in a single textual interpretation may implicate more than one service, and some services may be functionally linked (e.g., both a telephone service and a calendar service may utilize data from a contact list).

The NER component receives attempts to identify relevant grammars and lexical information in text data that may be used to construe meaning. To do so, the NLU component 260 may begin by identifying potential domains that may relate to the received text data. A NLU storage includes a database of device domains identifying domains associated with specific devices. For example, the device 110 may be associated with domains for music, telephony, calendaring, contact lists, and device-specific communications, but not video. In addition, an entity library may include database entries about specific services on a specific device, either indexed by Device ID, Speaker ID, Household ID, or some other indicator.

In NLU processing, a domain may represent a discrete set of activities having a common theme, such as "shopping", "music", "calendaring", etc. As such, each domain may be associated with a particular recognizer, language model and/or grammar database, a particular set of intents/actions, and a particular personalized lexicon. Each gazetteer may include domain-indexed lexical information associated with a particular user and/or device. A user's music-domain lexical information (e.g., a gazetteer associated with the user for a music domain) might correspond to album titles, artist names, and song names, for example, whereas a user's contact-list lexical information (e.g., a gazetteer associated with the user for a contact domain) might include the names of contacts. Since every user's music collection and contact list is presumably different, this personalized information improves entity resolution. A lexicon may represent what particular data for a domain is associated with a particular user. The form of the lexicon for a particular domain may be a data structure, such as a gazetteer. A gazetteer may be represented as a vector with many bit values, where each bit indicates whether a data point associated with the bit is associated with a particular user. For example, a music gazetteer may include one or more long vectors, each representing a particular group of musical items (such as albums, songs, artists, etc.) where the vector includes positive bit values for musical items that belong in the user's approved music list. Thus, for a song gazetteer, each bit may be associated with a particular song, and for a particular user's song gazetteer the bit value may be 1 if the song is in the particular user's music list. Other data structure forms for gazetteers or other lexicons are also possible.

As noted above, in traditional NLU processing, text data may be processed applying the rules, models, and information applicable to each identified domain. For example, if text represented in text data potentially implicates both communications and music, the text data may, substantially in parallel, be NLU processed using the grammar models and lexical information for communications, and processed using the grammar models and lexical information for music. The responses based on the text data produced by each set of models is scored, with the overall highest ranked result from all applied domains being ordinarily selected to be the correct result (e.g., the NLU results data 301).

An intent classification (IC) component processes the text data to determine an intent or intents for each identified domain, where the intent corresponds to the action to be performed that is responsive to the utterance represented in the text data. Each domain is associated with a database of words linked to intents. For example, a music intent database may link words and phrases such as "quiet," "volume off," and "mute" to a "mute" intent. The IC component identifies potential intents for each identified domain by comparing words in the text data to the words and phrases in the intents database. Traditionally, the determination of an intent by the IC component is performed using a set of rules or templates that are processed against the incoming text data to identify a matching intent.

In order to generate a particular interpreted response, the NER component applies the grammar models and lexical information associated with the respective domain to recognize a mention of one or more entities in the text represented in the text data. In this manner the NER component identifies "slots" (i.e., particular words in text data) that may be needed for later command processing. Depending on the complexity of the NER component, it may also label each slot with a type (e.g., noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC component are linked to domain-specific grammar frameworks with "slots" or "fields" to be filled. Each slot/field corresponds to a portion of the text data that the system believes corresponds to an entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER component may parse the text data to identify words as subject, object, verb, preposition, etc., based on grammar rules and/or models, prior to recognizing named entities. The identified verb may be used by the IC component to identify intent, which is then used by the NER component to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component then searches the corresponding fields in the domain-specific and personalized lexicon(s), attempting to match words and phrases in the text data tagged as a grammatical object or object modifier with those identified in the database(s).

This process includes semantic tagging, which is the labeling of a word or combination of words according to their type/semantic meaning. Parsing may be performed using heuristic grammar rules, or the NER component may be constructed using techniques such as HMMs, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the text data.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component may search a database of generic words associated with the domain. So for instance, if the text data corresponds to "play songs by the rolling stones," after failing to determine an album name or song name called "songs" by "the rolling stones," the NER component may search the domain vocabulary for the word "songs." In the alternative, generic words may be checked before the gazetteer information, or both may be tried, potentially producing two different results.

The results of NLU processing may be tagged to attribute meaning to the text data. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The NLU results data 301 output from the NLU processing (which may include tagged text data, commands, etc.) may then be sent to an application 290, which may be located on a same or separate server 120 as part of system 100. The system 100 may include more than one application 290, and the destination application 290 may be determined based on the NLU results data 301. For example, if the NLU results data 301 includes a command to play music, the destination application 290 may be a music playing application, such as one located on the device 110 or in a music playing appliance, configured to execute a music playing command. If the NLU results data 301 includes a search utterance (e.g., requesting the return of search results), the application 290 selected may include a search engine application, such as one located on a search server, configured to execute a search command and determine search results, which may include output text data to be processed by a text-to-speech engine and output from a device as synthesized speech.

The server(s) 120 may include a user recognition component 295. The user recognition component 295 may take as input the audio data 211 as well as the text data output by the ASR component 250. The user recognition component 295 may receive the ASR output text data from the ASR component 250 either directly or indirectly via the orchestrator component 230. Alternatively, the user recognition component 295 may be implemented as part of the ASR component 250. The user recognition component 295 determines respective scores indicating whether the utterance in the audio data 111 was spoken by particular users. The user recognition component 295 also determines an overall confidence regarding the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 to stored biometric data of users. User recognition may further involve comparing image data including a representation of at least a feature of a user with stored image data including representations of features of users. It should be appreciated that other kinds of user recognition processes, including those known in the art, may be used. Output of the user recognition component may be used to inform NLU processing as well as processing performed by 1P and 3P applications.

The server(s) 120 may additionally include a user profile storage 270. The user profile storage 270 includes data regarding user accounts. As illustrated, the user profile storage 270 is implemented as part of the server(s) 120. However, it should be appreciated that the user profile storage 270 may be located proximate to the server(s) 120, or may otherwise be in communication with the server(s) 120, for example over the network(s) 199. The user profile storage 270 may include a variety of information related to individual users, accounts, etc. that interact with the system 100.

One or more applications 290 may receive the NLU results data 301 (e.g., text data including tags attributing meaning to the words and phrases of the text data), and optionally output from the user recognition component 295 and/or data from the user profile storage 270, either directly or via the orchestrator component 230. FIG. 2 illustrates various 1P applications 290 of the system 100. However, it should be appreciated that the data sent to the 1P applications 290 may also be sent to 3P application servers 125 executing 3P applications.

Application, as used herein, may be considered synonymous with a skill. A "skill" may correspond to a domain and may be software running on a server(s) 120 and akin to an application. That is, a skill may enable a server(s) 120 or application server(s) 125 to execute specific functionality in order to provide data or produce some other output called for by a user. The system 100 may be configured with more than one skill. For example a weather service skill may enable the server(s) 120 to execute a command with respect to a weather service server(s) 125, a car service skill may enable the server(s) 120 to execute a command with respect to a taxi service server(s) 125, an order pizza skill may enable the server(s) 120 to execute a command with respect to a restaurant server(s) 125, etc.

The application or skill may be chosen based on the output of NLU processing. For example, if the NLU results data 301 includes a command to play music, the application/skill selected may correspond to a music playing application/skill. Many such applications/skills may be available to the system 100. If the NLU results data 301 includes a search utterance (e.g., requesting the return of search results), the application/skill selected may include a search engine application/skill.

Output of the application/skill may be in the form of text data to be conveyed to a user. As such, the application/skill output text data may be sent to a TTS component 280 either directly or indirectly via the orchestrator component 230. The TTS component 280 may synthesize speech corresponding to the received text data. Speech audio data synthesized by the TTS component 280 may be sent to the device 110*a* for output to a user.

The TTS component 280 may perform speech synthesis using one or more different methods. In one method of synthesis called unit selection, the TTS component 280 matches the text data or a derivative thereof against a database of recorded speech. Matching units are selected and concatenated together to form speech audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

Figure 3:
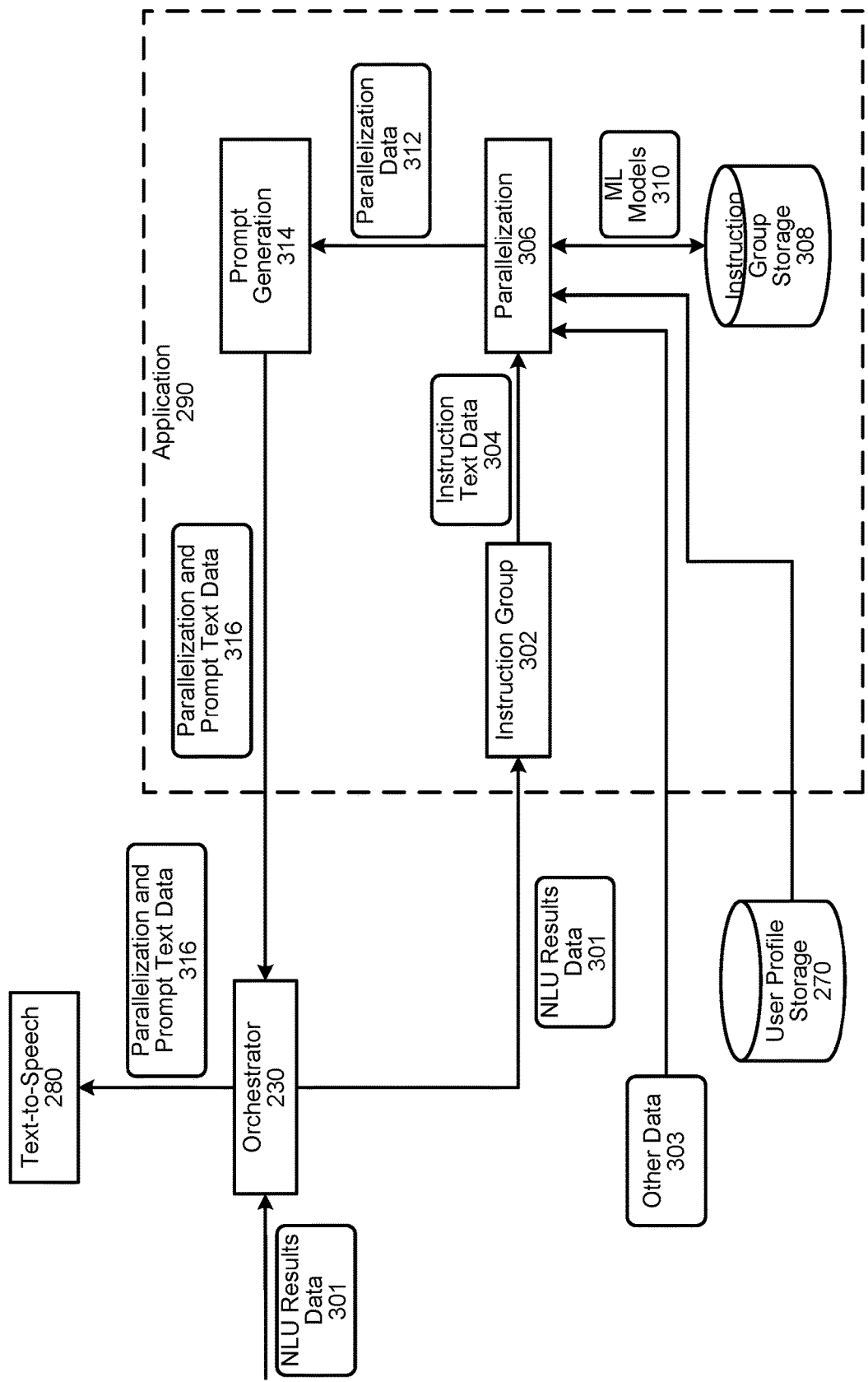
FIG. 3 is a diagram of components of a server(s) according to embodiments of the present disclosure.

The system 100 of the present disclosure may operate a VUI with respect to instruction groups. FIG. 3 illustrates components of a server(s) 120 that may determine parallelizable steps of text data representing a list of instructions and generate user prompts corresponding thereto.

The orchestrator component 230 may receive NLU results data 301 (as described herein above) either directly from the NLU component 260 or indirectly from the NLU component 260 via a different component of the server(s) 120. The orchestrator component 230 (or other component) may determine the NLU results data 301 invokes or otherwise relates to a request for a list of instructions to be output. The orchestrator component 230 may send the NLU results data 301, or a portion thereof, to an application 290 configured to perform operations with respect to instruction lists, in general. Alternatively, the orchestrator component 230 may determine a type of instruction list represented in the NLU results data 301 and send the NLU results data 301, or a portion thereof, to an application associated with the determined type of the instruction list. For example, the orchestrator component 230 may send NLU results data 301 associated with a recipe to a recipe application, may send NLU results data 301 associated with furniture assembly to a furniture assembly application. etc.

The application 290 may include an instruction group component 302. The instruction group component 302 receives the NLU results data 301, or a portion thereof, from the orchestrator component 230 and determines, therefrom, a source from which to receive instruction text data 304 responsive to the utterance represented in the NLU results data 301 or portion thereof. Instruction text data 304 may include various text portions depending upon the type of instructions (e.g., recipe, furniture assembly, etc.), the source from which the instruction text data 304 was received, etc. For example, instruction text data 304 may include an introductory text portion representing general instructions relevant to the list of instructions represented in the instruction text data 304. The instruction text data 304 may also include text portions corresponding to steps of the list of instructions. Instruction text data 304 may further include text portions indicating the tools or appliances needed to perform the instructions represented in the instruction text data 304, as well as the input materials (e.g., ingredients) needed to perform the instructions. The source may be a first party (1P) source (e.g., a storage controlled or managed by the server(s) 120) or a third party (3P) source (e.g., an application or storage managed by an application server(s) 125 in communication with the server(s) 120 but not necessarily directly controlled or managed by the server(s) 120). The instruction group component 302 receives instruction text data 304 from an appropriate source and sends the instruction text data 304 to a parallelization component 306.

The parallelization component 306 may be in communication with an instruction group storage 308 storing one or more machine learning trained models 310 and/or related training data used to train one or more parallelization machine learning models 310 of the parallelization component 306. In an example, the training data may be manually annotated by a user to indicate where parallel steps of a single list of instructions exist. The user may manually annotate multiple lists of instructions as such. The manually annotated training data may then be used to train a parallelization model 310 of the parallelization component 306. The manually annotated training data may be used to establish a ground truth for purposes of training one or more machine learning (ML) models 310 that may be used at runtime by the parallelization component 306. In machine learning, the term "ground truth" refers to the accuracy of a training set's classification for supervised learning techniques. Once trained, the parallelization model 310 may be applied to the instruction text data 304 to determine the existence of steps in the instruction text data 304 that may be performed in parallel.

Various other machine learning techniques may be used to train and operate the parallelization model. Such techniques may include backpropagation, statistical learning, supervised learning, semi-supervised learning, stochastic learning, or other known techniques. Such techniques may more specifically include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The parallelization component 306 may be in communication with a user profile storage 270 storing various user preferences associated with various users. The parallelization component 306 may use user preference data to inform parallelization processing as detailed herein. A user profile represented in the user profile storage 270 may include a user's preference(s) with respect to recipe ingredients. For example, a user profile may indicate soy milk should be used whenever a recipe calls for dairy milk. Such an indication may be based on user history. For example, the system may require a user speak a command to replace dairy milk with soy milk a threshold number of times before the system creates a user preferences for soy milk over dairy milk. The user profile storage 270 may store other user preferences, which may be considered by the parallelization component 306. A user profile may further include data representing how a user likes to receive instructions (e.g., the user likes to receive recipe summary information prior to receiving information associated with steps of the recipe), data representing the types of equipment (e.g., oven, blender, saw, drill, etc.) available to the user, etc.

The parallelization component 306 may consider other data 303 to inform parallelization processing as detailed herein. The other data 303 may represent how many users are participating to perform the instructions, how much time the user has available to perform the instructions, etc. The other data 303 may originate as a spoken utterance of the user. The system may perform speech processing on the spoken utterance to generate the other data 303 in a form usable by the parallelization component 306. The system may determine the user's time availability by determining entries in an electronic calendar associated with a profile of the user. The parallelization component 306 may suggest performing steps in a certain order based on the electronic calendar entries. For example, if the electronic calendar indicates the user has a meeting or appointment starting in 45 minutes and the user is requesting to start a recipe, the parallelization component 306 may prompt the user to perform steps involving minimal user interaction (e.g., thawing ingredients) until after the appointment or meeting is finished.

If the system 100 includes multiple applications that each executes with respect to a different type of instructions (e.g., recipe, furniture assembly, etc.), the manual annotation and other machine learning techniques described above may be performed on an application level. That is, training of a parallelization model of an application configured to execute with respect to recipe instructions may include training data limited to recipe instructions, training of a parallelization model of an application configured to execute with respect to furniture assembly instructions may include training data limited to furniture assembly instructions, etc. Alternatively, if the system 100 includes a single application that executes with respect to a variety of types of instructions, the manual annotation and other machine learning techniques described above may be performed on an instruction type level. That is, a parallelization model of the application may be trained with respect to recipe instructions using training data limited to recipe instructions, the same parallelization model may be trained with respect to furniture assembly instructions using training data limited to furniture instructions, etc. At runtime processing of an incoming request for VUI interaction with a list of instructions, the system may identify a type of instructions (e.g., furniture assembly, recipes, arts and crafts, computer repair, etc.), may access the appropriate ML model 310 and/or parallelization component 306 for that particular type of instructions, and may apply the model for that type when determining the ultimate output data.

The parallelization component 306 may apply the appropriate trained parallelization model to the instruction text data 304 to generate parallelization data 312. The parallelization data 312 includes text data indicating steps in the instructions, represented in the instruction text data 304, that may be performed in parallel. The parallelization data 312 may include groupings of steps when the instructions include at least a first group of steps that can be performed in parallel and a second group of steps that can be performed in parallel. For example, for a chicken lasagna recipe instruction group, a first group of steps may include the steps of boiling noodles and sautéing chicken, whereas a second group of steps may include the steps of preparing sauce and preparing a cheese blend.

The parallelization component 306 may generate metadata indicating certain steps of a list of instructions may be performed in parallel. The parallelization component 306 may include the metadata within the parallelization data 312. The parallelization component 306 may associate the metadata with text represented in the instruction text data 304 corresponding to the steps that may be performed in parallel.

The parallelization component 306 may send the parallelization data 312 to a prompt generation component 314.

The prompt generation component 314 generates parallelization and prompt text data 316 based on the parallelization data 312. The parallelization and prompt text data 316 may include a portion of text indicating the steps that may be performed in parallel as well as an introductory portion of text corresponding to, for example, "the following steps may be performed in parallel." Thus, the parallelization and prompt text data 316 may correspond to "the following steps may be performed in parallel: boiling lasagna noodles and sautéing chicken."

The prompt generation component 314 may send the parallelization and prompt text data 316 to the TTS component 280 either directly or via the orchestrator component 230. The TTS component 280 may perform TTS processing as described herein to generate output audio data corresponding to the parallelization and prompt text data 316.

FIGS. 4A and 4B illustrate the processing performed with respect to a command requesting output of a list of instructions. A device 110a receives (402) input audio corresponding to a spoken utterance. The device 110a generates input audio data corresponding to the received input audio and sends (404) the input audio data to the server(s) 120 for processing.

The server(s) 120 performs (406) ASR on the input audio data to generate input text data corresponding to the spoken utterance represented in the input audio data. The server(s) 120 also performs (408) NLU on the input text data to determine the spoken utterance corresponds to an intent to output instructions.

The server(s) 120 also determines (410), based on the NLU processing, a source storing or having access to the instructions indicated in the spoken utterance. The source may be a 1P storage (e.g., one controlled or managed by the server(s) 120). Alternatively, the source may be a 3P storage (e.g., one managed by an application server(s) 125 in communication with the server(s) 120 but not controlled or managed by the server(s) 120). Illustrative 3P storages include a storage associated with recipes, a storage associated with furniture assembly (such as one associated with a particular furniture store), various Internet accessible websites or other information sources, etc. If the source is a 3P storage, the server(s) 120 may send (412) a signal to an application server(s) 125 associated with the 3P storage. In response, the server(s) 120 may receive (414) instruction text data 304 from the application server(s) 125.

The server(s) 120 determines (416) text corresponding to steps represented in the instruction text data 304 that may be performed in parallel. Such determination may include various determinations as detailed throughout the present disclosure.

The server(s) 120 also generates (418) output text data including at least a portion indicating the steps that may be performed in parallel. The output text data may also include an introductory portion of text. Example output text data may include text corresponding to "the following steps may be performed in parallel: boiling the lasagna noodles and sautéing the chicken." According to this example, "the following steps may be performed in parallel" is the introductory portion of text and "boiling the lasagna noodles and sautéing the chicken" is the portion of text indicating the steps that can be performed in parallel. The server(s) 120 performs (420) TTS on the output text data to generate output audio data and sends (422) the output audio data to the device 110a or another device, such as a device indicated in a profile associated with the user. The device 110a or other device than outputs (424) audio corresponding to the output audio data.

Figure 5:
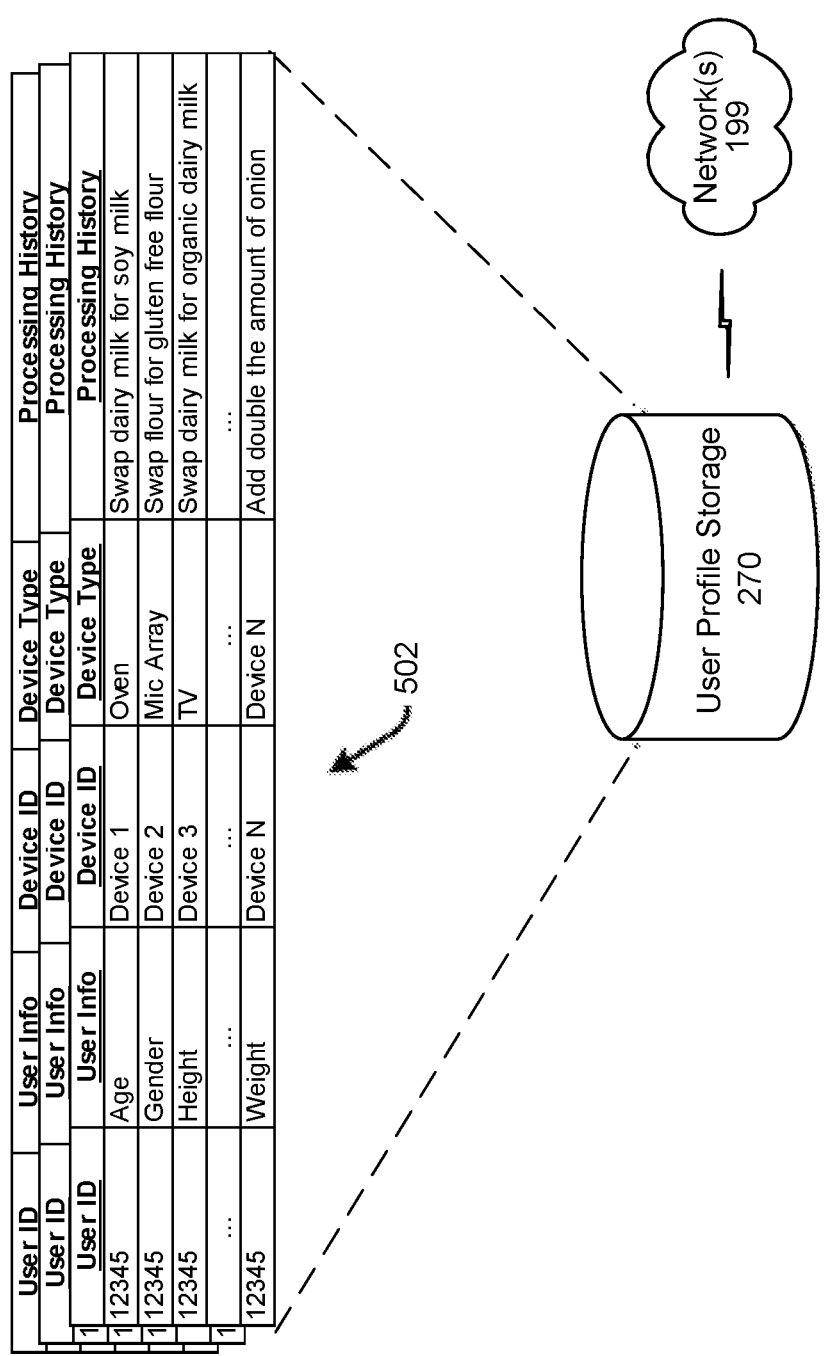
FIG. 5 illustrates data stored and associated with user profiles according to embodiments of the present disclosure.

FIG. 5 illustrates the user profile storage 270 that includes data regarding user accounts 502. For illustration, as shown in FIG. 5, each user profile 502 may include data such as user identifier (ID) data, data indicating various characteristics of the user, name of device data, data indicating the type of each device, processing history data, as well as other data not explicitly illustrated.

Figure 6:
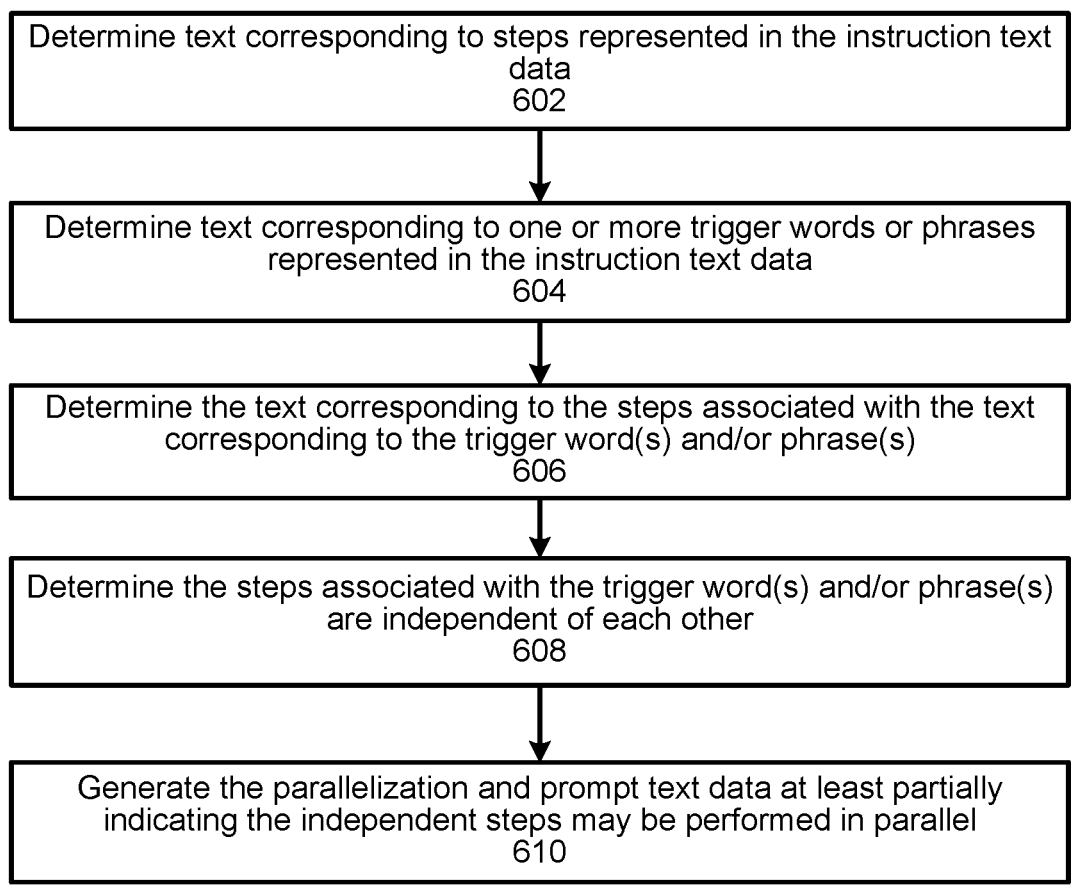
FIG. 6 is a process flow diagram illustrating a method for determining steps of a list of instructions that may be performed in parallel according to embodiments of the present disclosure.

As stated above, the system 100 may determine steps of a list of instructions that may be performed in parallel using various techniques. FIG. 6 illustrates a method for determining steps of a list of instructions that may be performed in parallel based on the presence of text corresponding to one or more trigger words within instruction text data 304. The parallelization component 306, the prompt generation component 314, as well as other components of the server(s) 120 may perform the steps of FIG. 6. The system processes the instruction text data 304 to determine (602) text corresponding to steps of the instructions represented in the instruction text data 304. The system also processes the instruction text data 304 to determine (604) text corresponding to one or more trigger words or phrases represented in the instruction text data 304. Illustrative trigger words and phrases include "meanwhile," "in parallel," "while you are," as well as other conditional language. The system additionally processes the instruction text data 304 to determine (606) the text corresponding to the steps represented in the instructions that are associated with the text corresponding to the trigger word(s) and/or phrase(s). The system then determines (608) which of the steps associated with the trigger word(s) and/or phrase(s) are independent of each other. Such determination may include determining the input materials of the steps are different. This may result in independent grouping of steps being determined. The system then generates (610) the parallelization and prompt text data 316, with the parallelization and prompt text data 316 at least partially indicating the independent steps, or groups of steps, that may be performed in parallel.

Figure 7:
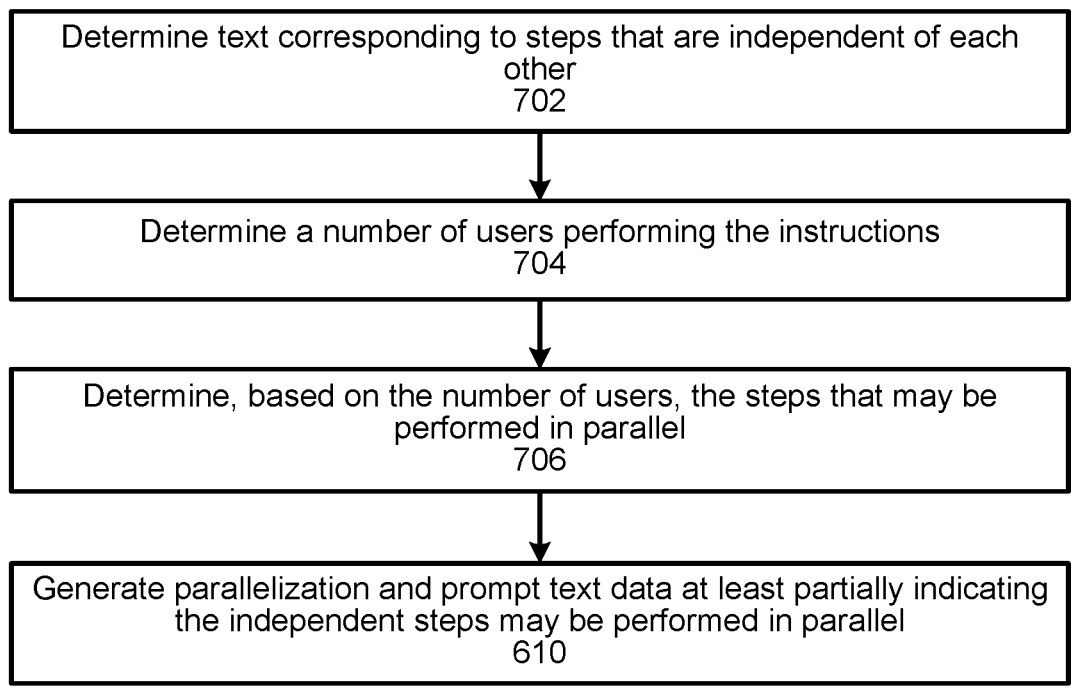
FIG. 7 is a process flow diagram illustrating a method for determining steps of a list of instructions that may be performed in parallel according to embodiments of the present disclosure.

FIG. 7 illustrates another method for determining steps of a list of instructions that may be performed in parallel based on a number of users available to perform the instructions. In an example, the system may determine, based on image data received from a camera, a number of representations of users. The system may then determine the number of representations of users corresponds to the number of users performing the instructions. In another example, the system may determine, based on audio data received from a microphone or array or microphones, a number of users speaking. The system may determine the number of users speaking corresponds to the number of users performing the instructions. In yet another example, the system may receive audio corresponding to an utterance, and process audio data corresponding to the audio to determine the utterance indicates the number of users that will perform the instructions. The parallelization component 306, the prompt generation component 314, as well as other components of the server(s) 120 may perform the steps of FIG. 7. The system processes the instruction text data 304 to determine (702) text corresponding to steps that are independent of each other (e.g., steps that may be performed in parallel). The system may determine such based on text corresponding to trigger words and/or phrases being present in the instruction text data 304 as described with respect to FIG. 6, or may be based on one or more other determinations.

The system then determines (704) a number of users performing the instructions. The system may determine the number of users in various ways. In one example, the system 100 may receive audio including a spoken utterance corresponding to the number of users that will perform the instructions. The system may receive such audio as part of the command requesting output of the instructions. Alternatively, the system may receive such audio in response to the system 100 audibly or visually prompting the user for the number of users that will perform the instructions. In another example, the system 100 may be configured with one or more cameras. When the command requesting output of the instructions is received as input audio data, the system 100 may capture an image. The system may process image data corresponding to the image to determine representations of one or more users. The system 100 may then determine a number of users performing the instructions corresponding to the number of representations of users in the image data.

Based on the number of users, the system may determine (706) steps of the instructions that may be performed in parallel. A list of instructions may include groups of steps that may be performed in parallel. Each group of steps may be associated with a number of users that are required to perform the group of steps in parallel. Thus, if the system determines only one user will be performing the instructions, the system may determine only the group(s) of steps that may be performed in parallel by a single user. The system may then generate (610) the parallelization and prompt text data 316, with the parallelization and prompt text data 316 at least partially indicating the independent steps, or groups of steps, that may be performed in parallel based on the number of users performing the instruction group.

Figure 8:
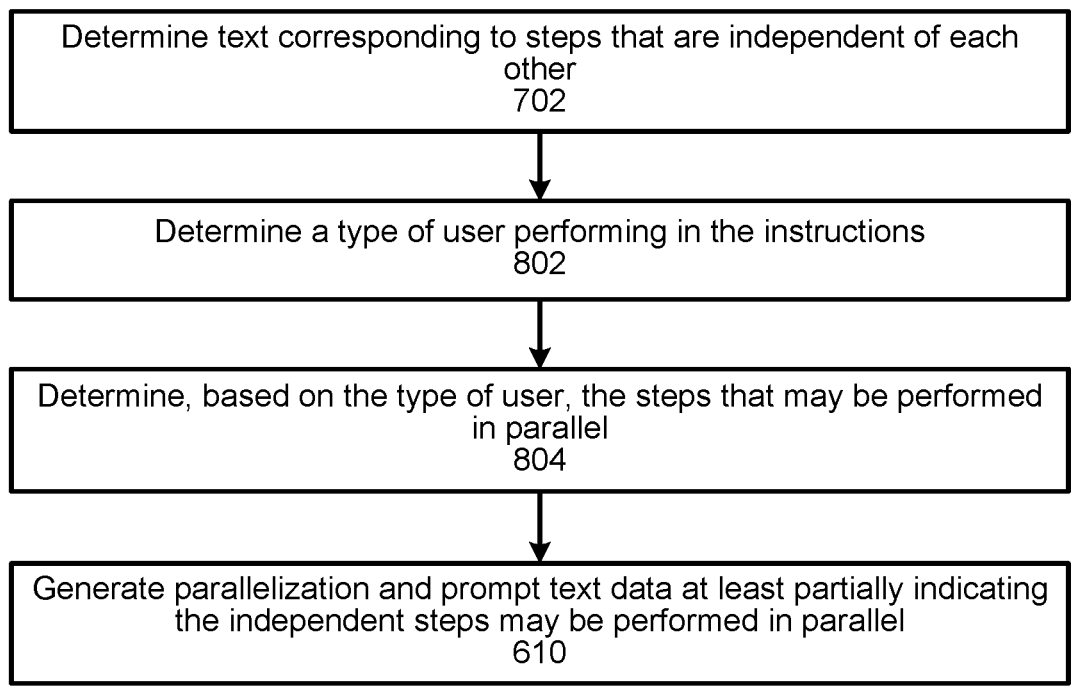
FIG. 8 is a process flow diagram illustrating a method for determining steps of a list of instructions that may be performed in parallel according to embodiments of the present disclosure.

FIG. 8 illustrates a further method for determining steps of a list of instructions that may be performed in parallel based on a type of user performing the instructions. User types may include gender (e.g., male v. female), experience (e.g., expert v. novice), age (e.g., child v. adult), handedness (e.g., left handed v. right handed), etc. The parallelization component 306, the prompt generation component 314, as well as other components of the server(s) 120 may perform the steps of FIG. 8. The system processes the instruction text data 304 to determine (702) text corresponding to steps that are independent of each other (e.g., steps that may be performed in parallel). The system may determine such based on text corresponding to trigger words and/or phrases being present in the instruction text data 304 as described with respect to FIG. 6, or may be based on one or more other determinations.

The system then determines (802) a type of user performing the instructions. The system may determine the type of user in various ways. In one example, the system 100 may determine the user's identity (e.g., using speech characteristics, biometric data, image data, etc.); determine a profile associated with the user; and determine, in the profile, data indicating characteristics of the user. In another example, the system 100 may be configured with one or more cameras. When the command requesting output of the instructions is received as input audio data, the system 100 may capture an image. The system may process image data corresponding to the image to determine a representation of the user. The system may then analyze the representation using various models to determine characteristics of the user, such as approximate age, gender, height, weight, etc.

Based on the type of user, the system may determine (804) steps of the instructions that may be performed in parallel. A list of instructions may include groups of steps that may be performed in parallel. Each group of steps may be associated with a type of user that is required to perform the group of steps in parallel. For example, one group of steps may be performed in parallel by a child while another group of steps may only be performed in parallel by an adult. Thus, if the system determines the user is a child, the system may determine only the group(s) of steps that may be performed in parallel by a child. The system may then generate (610) parallelization and prompt text data 316, with the parallelization and prompt text data 316 at least partially indicating the independent steps, or groups of steps, that may be performed in parallel based on the type of user performing the instruction group.

Figure 9:
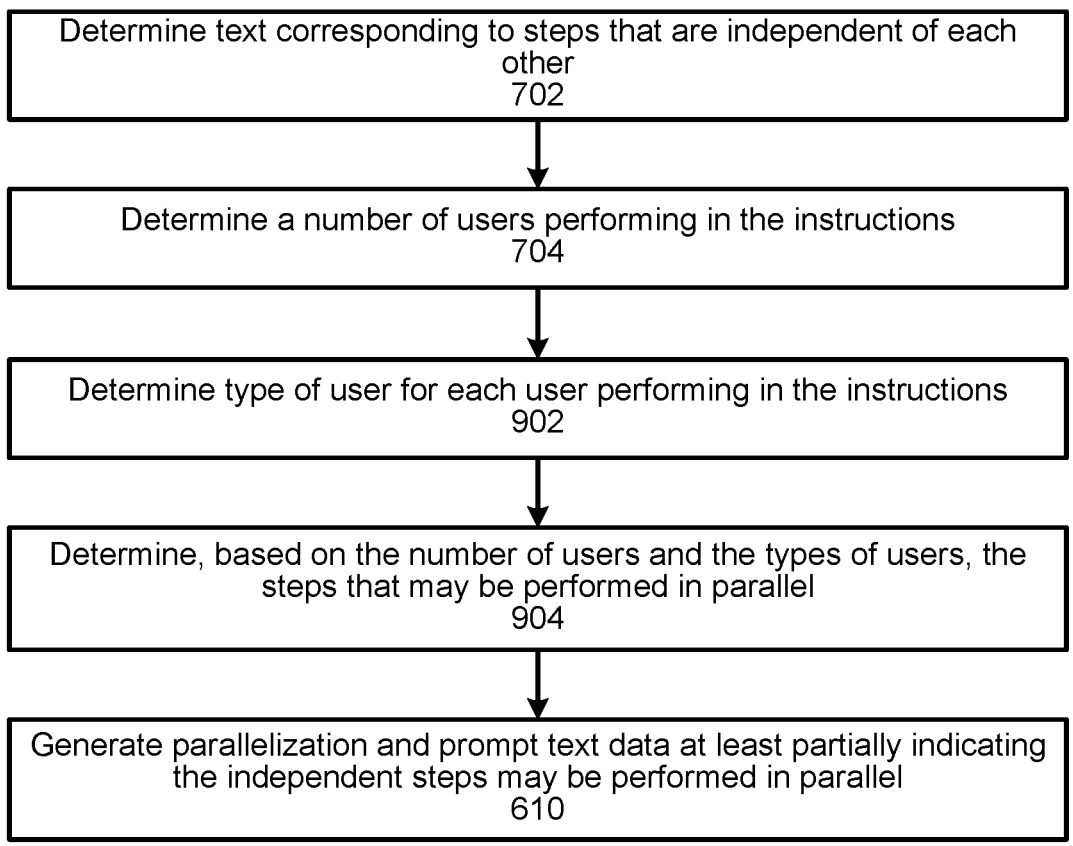
FIG. 9 is a process flow diagram illustrating a method for determining steps of a list of instructions that may be performed in parallel according to embodiments of the present disclosure.

FIG. 9 illustrates yet another method for determining steps of a list of instructions that may be performed in parallel based on both a number of users as well as types of users performing the instructions. The parallelization component 306, the prompt generation component 314, as well as other components of the server(s) 120 may perform the steps of FIG. 9. The system may process the instruction text data 304 to determine (702) text corresponding to steps that are independent of each other (e.g., steps that may be performed in parallel). The system may determine such based on text corresponding to trigger words and/or phrases being present in the instruction text data 304 as described with respect to FIG. 6, or may be based on one or more other determinations.

The system determines (704) a number of users performing the instructions. The system also determines (902) the types of users performing the instructions. Based on the number and types of users, the system determines (904) the steps of the instructions that may be performed in parallel. A list of instructions may include groups of steps that may be performed in parallel. Each group of steps may be associated with a number of users required to perform the steps of the group as well as the types of users required to perform the steps of the group. For example, one group of steps may be performed in parallel by a child and an adult while another group of steps may only be performed by two or more adults. The system may then generate (610) parallelization and prompt text data 316, with the parallelization and prompt text data 316 at least partially indicating the independent steps, or groups of steps, that may be performed in parallel based on the number and types of users performing the instruction group.

Figure 10:
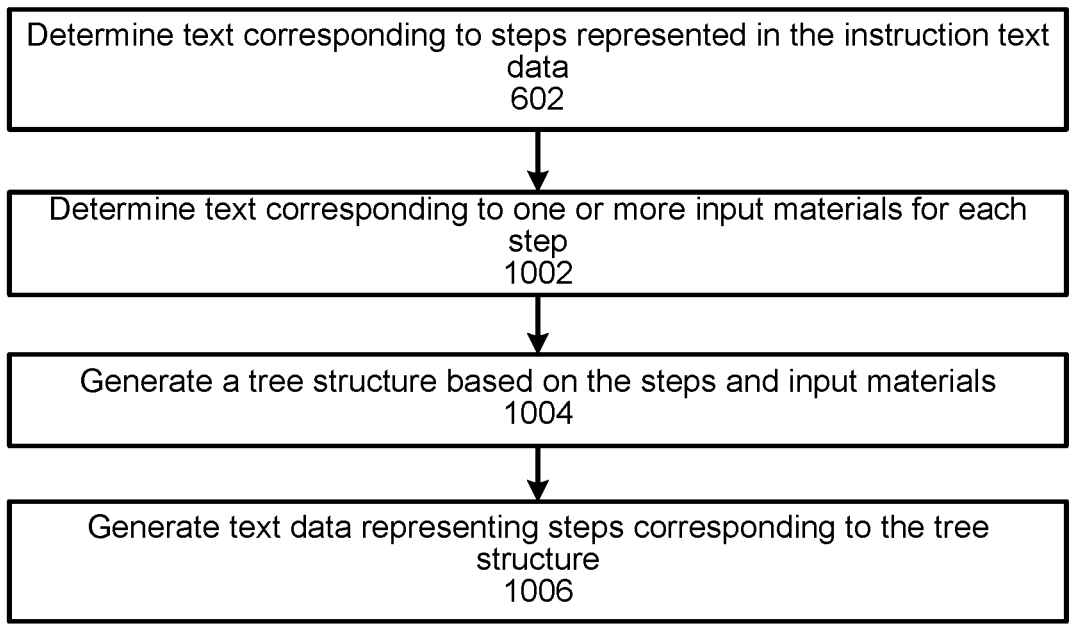
FIG. 10 is a process flow diagram illustrating a method for breaking up steps of a list of instructions to account for user action according to embodiments of the present disclosure.

Instructions ideally include steps and an order of steps that may easily be followed by a user. Sometimes, however, instructions include steps that are not organized in a sequence considered most logical to a user. FIG. 10 illustrates a method for organizing steps of a list of instructions to account for user action and thereby make the instructions easy to follow by a user. The parallelization component 306, the prompt generation component 314, as well as other components of the server(s) 120 may perform the steps of FIG. 10.

The system processes the instruction text data 304 to determine (602) text corresponding to steps represented in the instruction text data 304. The system also processes the instruction text data 304 to determine (1002) text corresponding to one or more input materials for each step. A system may generate (1004) a tree structure (illustrated in FIG. 11 and discussed further below) based on the determined steps and input materials. For recipe instructions, input materials may correspond to ingredients as well as tools. For example, one material may correspond to garlic, another material may correspond to a knife, and so on. For furniture installation instructions, input materials may correspond to pieces of physical material used to build the furniture as well as tools. For example, one material may correspond to a 2×4 piece of lumber, another material may correspond to a hammer, and so on. Various other examples of materials are possible for other types of instructions (e.g., arts and crafts, house painting, etc.). As used herein, a raw input material is a material that is not output by a step of the instructions. The system may generate (1006) text data representing steps corresponding to the tree structure. The system may send the text data to the TTS component 280 for processing.

Figure 11:
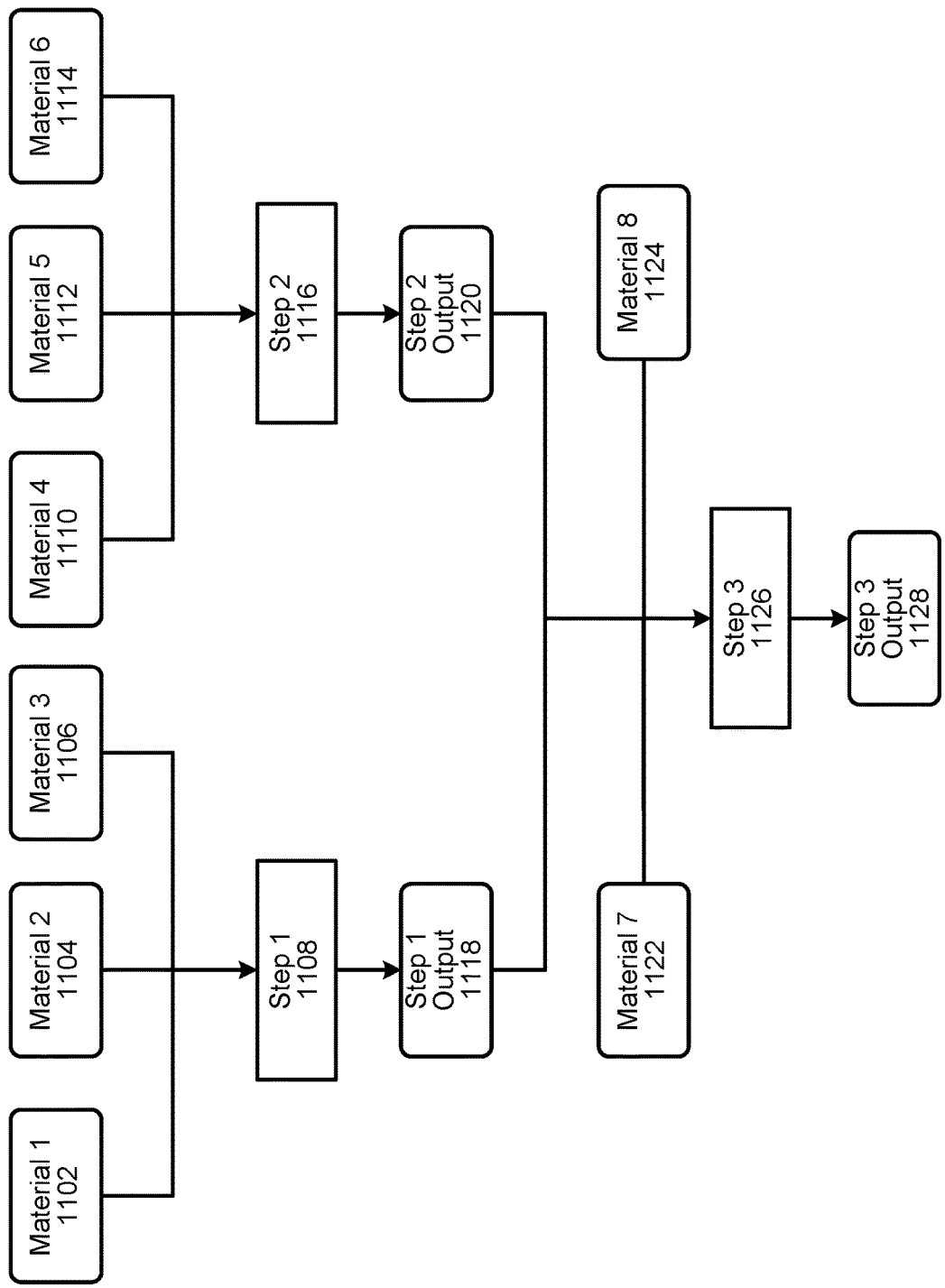
FIG. 11 illustrates a tree structure corresponding to a list of instructions according to embodiments of the present disclosure.

FIG. 11 illustrates a possible tree structure as discussed with respect to FIG. 10. As illustrated, a first raw material 1102, a second raw material 1104, and a third raw material 1106 may be input materials of a first step 1108. A fourth raw material 1110, a fifth raw material 1112, and a sixth raw material 1114 may be input materials of a second step 1116. A first output 1118 of the first step 1108, a second output 1120 of the second step 1116, a seventh raw material 1122, and an eighth raw material 1124 may be input materials of a third step 1126. The third step 1126 may produce a third output 1128 that is not used as an input to any other step of the instructions. It should be appreciated that the tree structure illustrated in and described with respect to FIG. 11 is merely illustrative, and that the tree structure of each group of instruction may be different.

Figure 12:
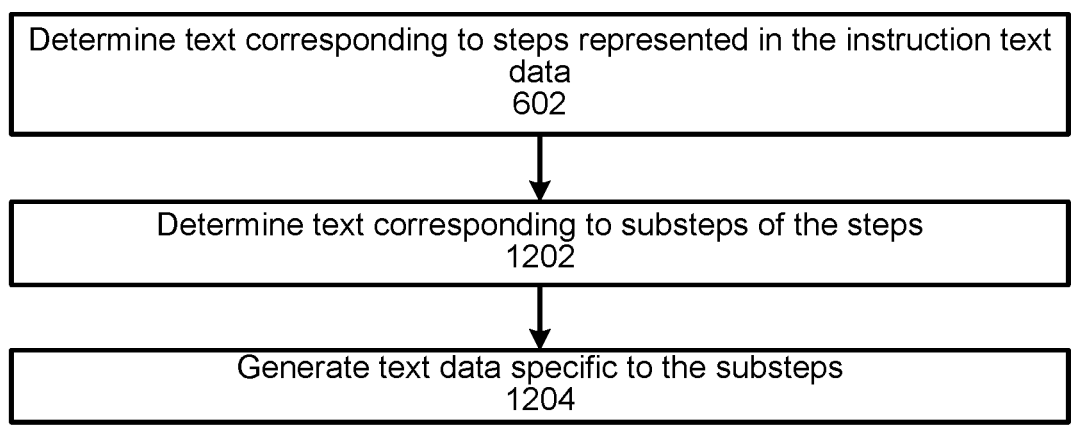
FIG. 12 is a process flow diagram illustrating a method for separating substeps of a step of a list of instructions to account for user action according to embodiments of the present disclosure.

Instructions may be prepared with one or more compound steps (i.e., steps including substeps) that are easily followed by a user when the user can visually see text representing a compound step. Such compound steps are not beneficial when the user is performing the instructions using a VUI. For example, a compound step may correspond to "chop the onion, chop the tomato, and chop the cilantro." It is unbeneficial for a VUI to output audio corresponding to "chop the onion, chop the tomato, and chop the cilantro" because such would require the user remember all of the substeps audibly output although each substep involves separate user action. FIG. 12 illustrates a method for separating the substeps of a compound step. The parallelization component 306, the prompt generation component 314, as well as other components of the server(s) 120 may perform the steps of FIG. 12.

The system processes the instruction text data 304 to determine (602) text corresponding to steps represented in the instruction text data 304. The system also processes the instruction text data 304 to determine (1202) text corresponding to substeps of the steps. The system may determine the text corresponding to the substeps by processing the text corresponding to a step to determine text corresponding to commas, semicolons, or other punctuation marks. The system may determine a punctuation mark corresponds to the end of one substep and the beginning of another substep. The system may also determine text corresponding to substeps by processing text corresponding to a step to determine the presence of more than one verb. The system may determine a verb to be the beginning of a substep. The system may generate (1204) text data specific to the substeps (1204). Each portion of the text data may be specific to a single substep. The system may output each portion of the text data separately. This results in the user only hearing a single substep at a time. The system may send the generated text data to the TTS component 280 for processing.

A clustering model may be used to ensure substeps that are related are not separated once the substeps are broken out from the compound step. For example, a compound step may include a first step, a second step, and a third step. The first step and the second step may relate to the same materials, whereas the third step may not relate to materials of the first step and the second step. The clustering model would ensure that the output to the user clusters the first step and the second step based on those steps relating to the same materials.

Figure 13:
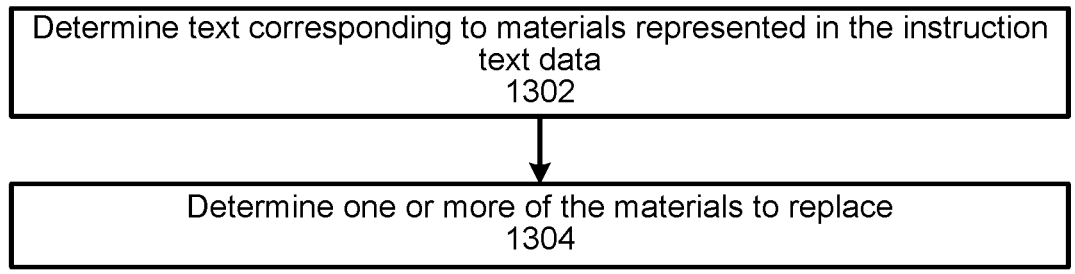
FIG. 13 is a process flow diagram illustrating a method for replacing materials of a list of instructions based on user preferences according to embodiments of the present disclosure.

Users may be allergic to different substances and/or may simply have preferences not accounted for in a list of instructions. When the system 100 outputs instructions to a user, the user may instruct the system 100 to replace a material for another material preferred by the user. The system may store such user instructions in a profile associated with the user. FIG. 13 illustrates a method for replacing materials of a list of instructions based on user preferences. The parallelization component 306, the prompt generation component 314, as well as other components of the server(s) 120 may perform the steps of FIG. 13.

The system processes the instruction text data 304 to determine (1302) text corresponding to materials represented in the instruction text data 304. The system determines (1304) one or more of the materials to be replaced (1304). In one example, the system 100 may determine the user's identity (e.g., using speech characteristics, biometric data, image data, etc.); determine a profile associated with the user; determine, in the profile, data indicating the material(s); and determine, in the profile, data indicating the material(s) to replace the material(s) represented in the instruction text data 304 with. In another example, the system 100 may process previous user interactions with the system to determine the material(s) to replace. For example, rather than indicating a material should be replaced in the user's profile, the user may speak a command to replace a material with another material. The system 100 may store the user command and use such to determine at a later time that the material should be replaced with the other material. Thresholding may be implemented to ensure accuracy of material replacements. For example, the system 100 may require the user speak a command to replace one material for another a threshold number of times prior to the system 100 replacing the material for the other without user instruction to do so. The system 100 may perform any ratio conversions necessary to properly replace the materials.

Figure 14:
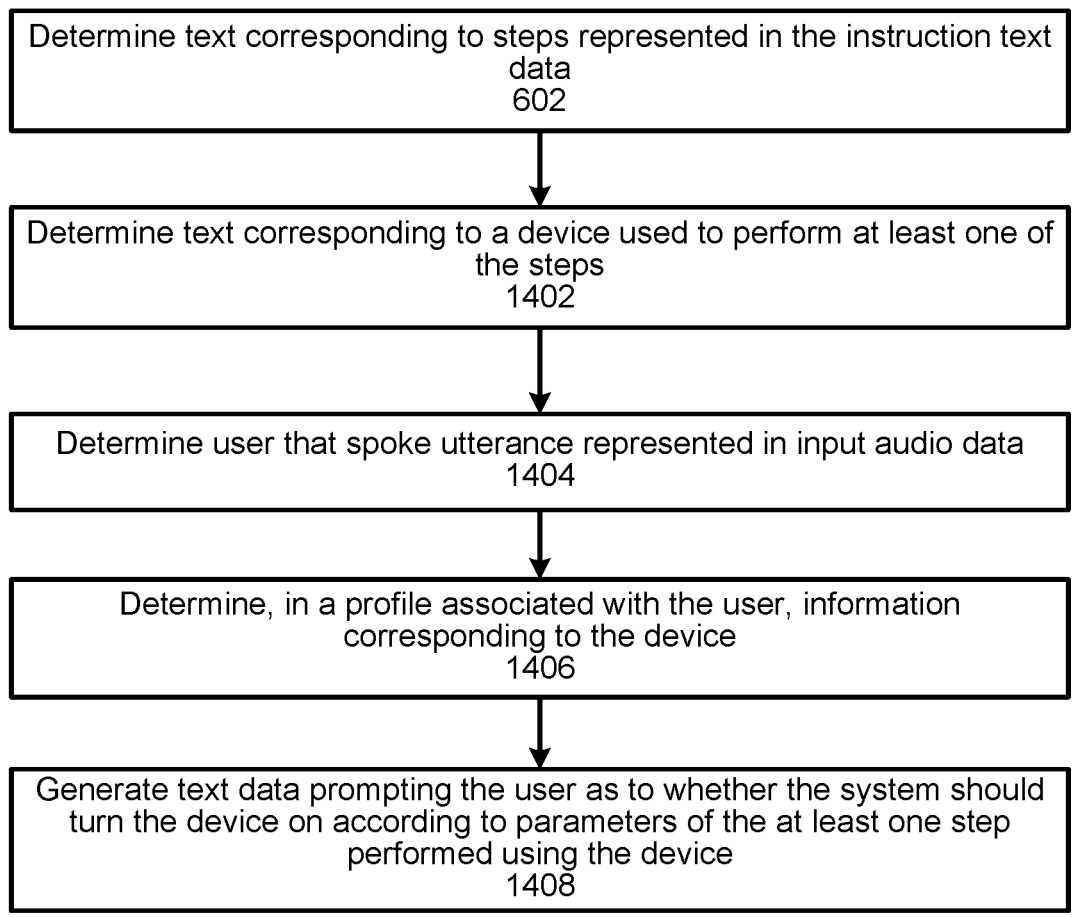
FIG. 14 is a process flow diagram illustrating a method for prompting a user as to whether the system should turn on a user device according to embodiments of the present disclosure.

As technology progresses, devices are becoming smarter. User devices may be turned on and/or off by a remote device, such as the server(s) 120. FIG. 14 illustrates a method for prompting a user as to whether the system 100 should turn on a user device. The parallelization component 306, the prompt generation component 314, as well as other components of the server(s) 120 may perform the steps of FIG. 14.

The system processes the instruction text data 304 to determine (602) text corresponding to steps represented in the instruction text data 304. The system also processes the instruction text data 304 to determine (1402) text corresponding to a device used to perform at least one of the steps. The system determines such by processing the instruction text data 304 to determine text corresponding to a type of device, such as oven, stove, etc.

The system determines (1404) an identity of the user that spoke the utterance represented in the input audio data 211. The system may determine (1406) information corresponding to the device in a profile associated with the user. Based on the device being represented in the profile, the system may generate (1408) text data, with the text data prompting the user as to whether the system should turn the device on according to parameters of the at least one step performed using the device. For example, if the step corresponds to cook lasagna at 450° for twenty minutes, the text data may correspond to "you will need to cook the lasagna at 450°, should I preheat your oven to 450°." The user may then respond by saying "yes." The system may perform speech processing (e.g., ASR and NLU) with respect to the user's utterance to determine the oven should be turned on to 450°. The system may then turn the oven on to 450°.

Figure 15:
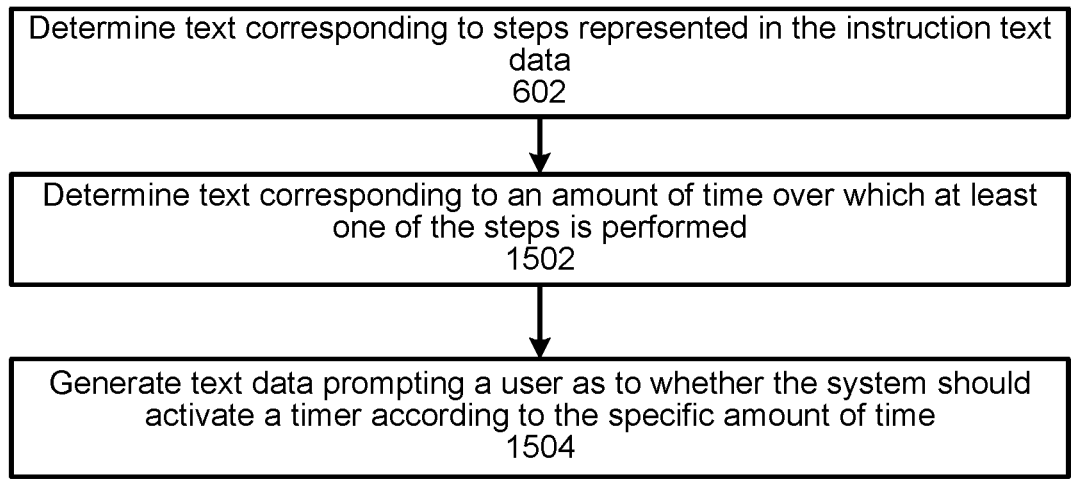
FIG. 15 is a process flow diagram illustrating a method for prompting a user as to whether the system should activate a timer according to embodiments of the present disclosure.

The system 100 may be configured with one or more electronic timers. A list of instructions may include one or more steps that are performed over a specific amount of time. FIG. 15 illustrates a method for prompting a user as to whether the system 100 should activate a timer. The parallelization component 306, the prompt generation component 314, as well as other components of the server(s) 120 may perform the steps of FIG. 15.

The system may process the instruction text data 304 to determine (602) text corresponding to steps represented in the instruction text data 304. The system may also process the instruction text data 304 to determine (1502) text corresponding to an amount of time over which at least one of the steps is performed. The system may determine such by processing the instruction text data 304 to determine text corresponding to one or more units of time. The system may generate (1504) text data prompting a user as to whether the system 100 should activate a time according to the specific amount of time. For example, if a step corresponds to baking lasagna for twenty minutes, the text data may correspond to "should I start a timer for twenty minutes for baking the lasagna." The system may send the text data to the TTS component 280 for processing.

More than one timer may be prompted to the user. For example, a first timer with respect to baking lasagna may be prompted to the user, a second timer with respect to sautéing chicken may be prompted to the user, etc. Thus, it should be appreciated that the system 100 may associate each timer with unique information (e.g., a unique ID or unique name such as lasagna timer, sauté timer, etc.). The system 100 may have multiple timers running at any given moment for steps being performed in parallel. Thus, it should be appreciated that the unique information allows the system 100 to recall a present amount of time remaining for a specific timer if the user inquires. For example, if the user says "how much longer does the lasagna need to bake," the system 100 may perform natural language processing on text data corresponding to the user speech to determine the utterance pertains to a lasagna timer, and therefrom recall the time remaining on the lasagna timer.

Alternatively, the user can speak a command that invokes the activation of a timer. For example, the user can say "start the lasagna timer," "start the 20 minute timer," or some other command intended to start a timer with respect to a step of cooking lasagna for twenty minutes. The system 100, knowing the steps involved in the instructions, may associate the timer with a unique identifier indicating the baking lasagna step. The system 100 may also output a prompt to verify the system 100 determinations are correct. According to the above example, the system 100 could output a prompt to the user corresponding to "is this for baking the lasagna."

Figure 16:
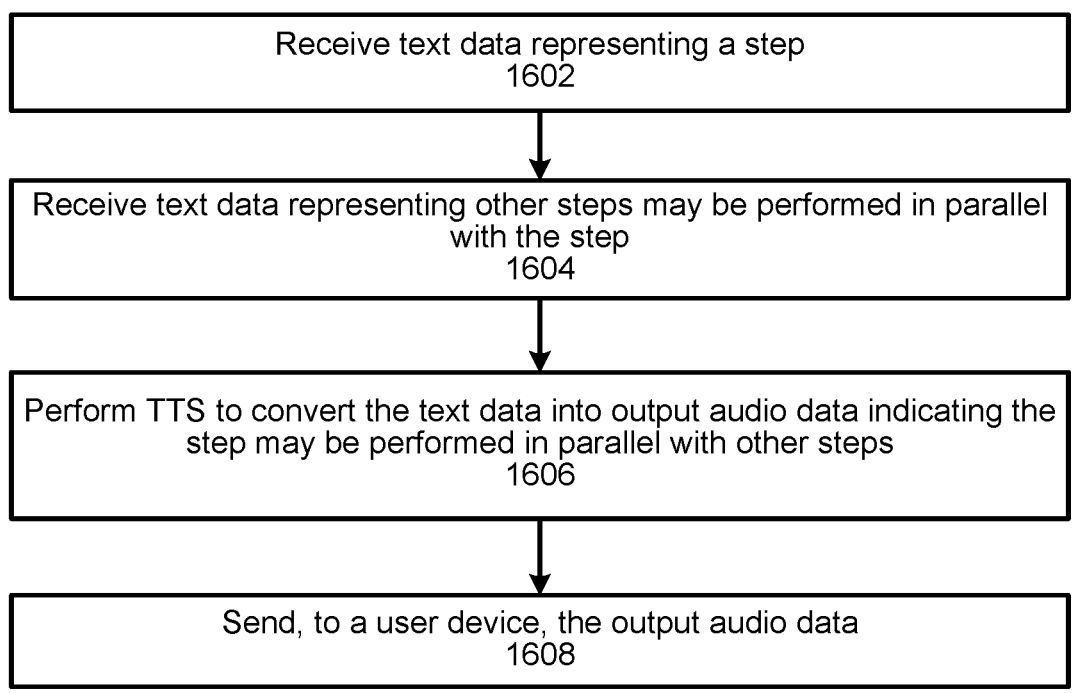
FIG. 16 is a process flow diagram illustrating a method for generating TTS output including a step portion and a prompt portion according to embodiments of the present disclosure.

The system 100 may output the aforementioned prompts and other content to users in various forms. FIG. 16 illustrates a method for generating TTS output including a step portion and a prompt portion.

The TTS component 280 receives (1602), from the orchestrator component 230 or another component of the server(s) 120, text data representing a step represented in the instruction text data 304. The TTS component 280 may receive such as part of the parallelization and prompt text data 316. The TTS component 280 also receives (1604) text data representing that other steps in the instruction text data 304 may be performed in parallel with the step. The TTS component 280 may receive such as part of the parallelization and prompt text data 316. The TTS component 280 performs (1606) TTS to generate output audio data indicating the step may be performed in parallel with other steps of the instructions. The output audio data may generally refer to the other steps (e.g., the output audio data may correspond to "boiling noodles for the lasagna may be performed in parallel with other steps of the recipe"). Alternatively, the output audio data may specifically refer to the other steps (e.g., the output audio data may correspond to "boiling noodles for the lasagna may be performed in parallel with sautéing the chicken"). The system sends (1608) the output audio data to a user device (e.g., either the device 110a from which the original utterance was received or another device associated with a profile of the user).

Figure 17:
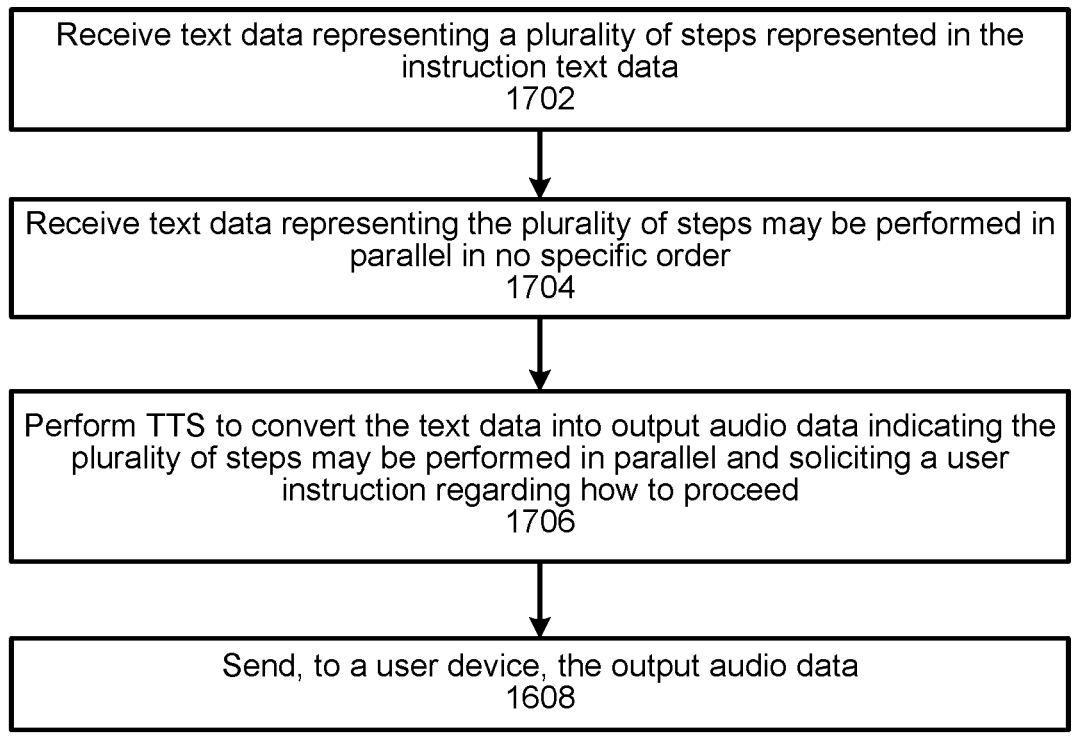
FIG. 17 is a process flow diagram illustrating a method for generating TTS output prompting a user to indicate an order in which the user would like to proceed according to embodiments of the present disclosure.

Some lists of instructions have numerous steps that may be performed in parallel in no specific order. FIG. 17 illustrates a method for generating TTS output prompting a user to indicate an order in which the user would like to proceed. The TTS component 280 receives (1702), from the orchestrator component 230 or another component of the server(s) 120, text data representing a plurality of steps represented in the instruction text data 304. The TTS component 280 may receive such as part of the parallelization and prompt text data 316. The TTS component 280 also receives (1704) text data representing that the plurality of steps may be performed in parallel in no specific order. The TTS component 280 may receive such as part of the parallelization and prompt text data 316. The TTS component 280 performs (1706) TTS to generate output audio data indicating the steps may be performed in parallel and soliciting a user instruction regarding how to proceed. For example, the output audio data may correspond to "you may chop the peppers, chop the onions, and chop the tomatoes in any order, how would you like to proceed." The system sends (1608) the output audio data to a user device (e.g., either the device 110a from which the original utterance was received or another device associated with a profile of the user).

Figure 18:
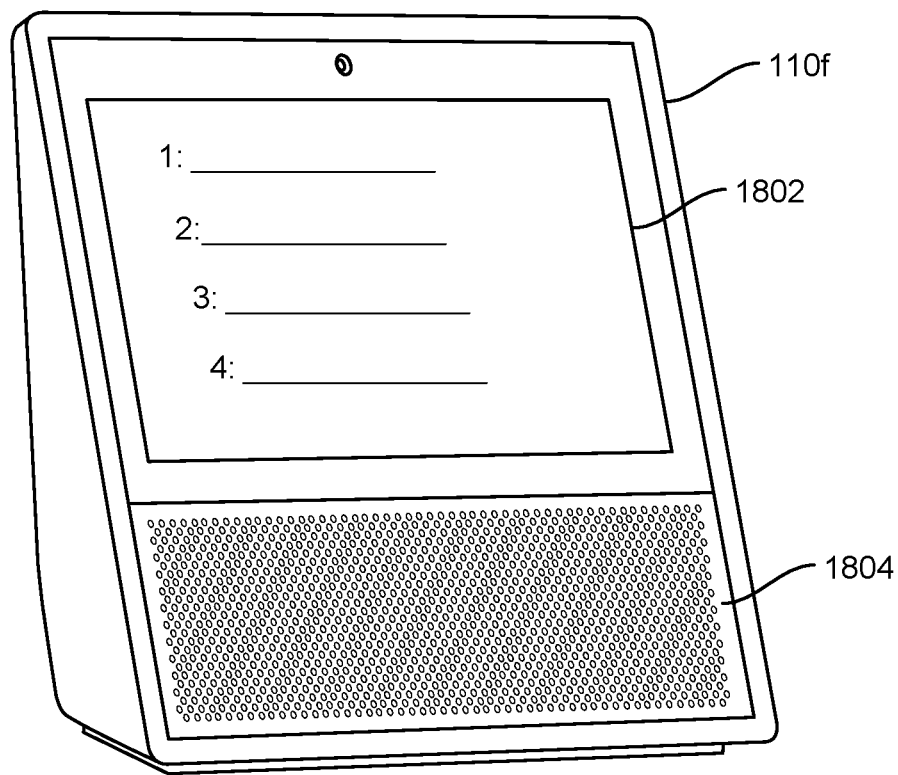
FIG. 18 illustrates a device displaying text corresponding to steps that may be performed in parallel according to embodiments of the present disclosure.

In addition to audibly indicating to a user that steps may be performed in parallel, the system may be configured with a device capable of visually indicating that the steps may be performed in parallel. FIG. 18 illustrates a device 110f displaying text corresponding to steps that may be performed in parallel. A display 1802 of the device 110f may display the text simultaneously or substantially simultaneously with one or more speakers 1804 of the device 110f outputting audio data at least partially corresponding to the displayed text.

The device 110f may display text corresponding to all steps that may be performed in parallel. The user may then say the order in which the user wants to perform the steps. In response, the device 110f may display only text corresponding to the first step to be performed until the user indicates the first step is complete, at which time the device 110f then displays only text corresponding to the second step to be performed, and so on. Instead of indicating the entire order, the user may simply say the first step the user wants to perform. In response, the device 110f may display only text corresponding to the first step to be performed until the user indicates the first step is complete, at which the time the device 110f displays text corresponding to the remaining steps that may be performed in parallel. The user may then either indicate the next step to be performed or indicate an order in which the remaining steps are to be performed.

User devices may be configured with one or more cameras. Rather than having the user verbally indicate a step is finished, the device may process image data captured by the one or more cameras to determine when a step is finished.

Figure 19:
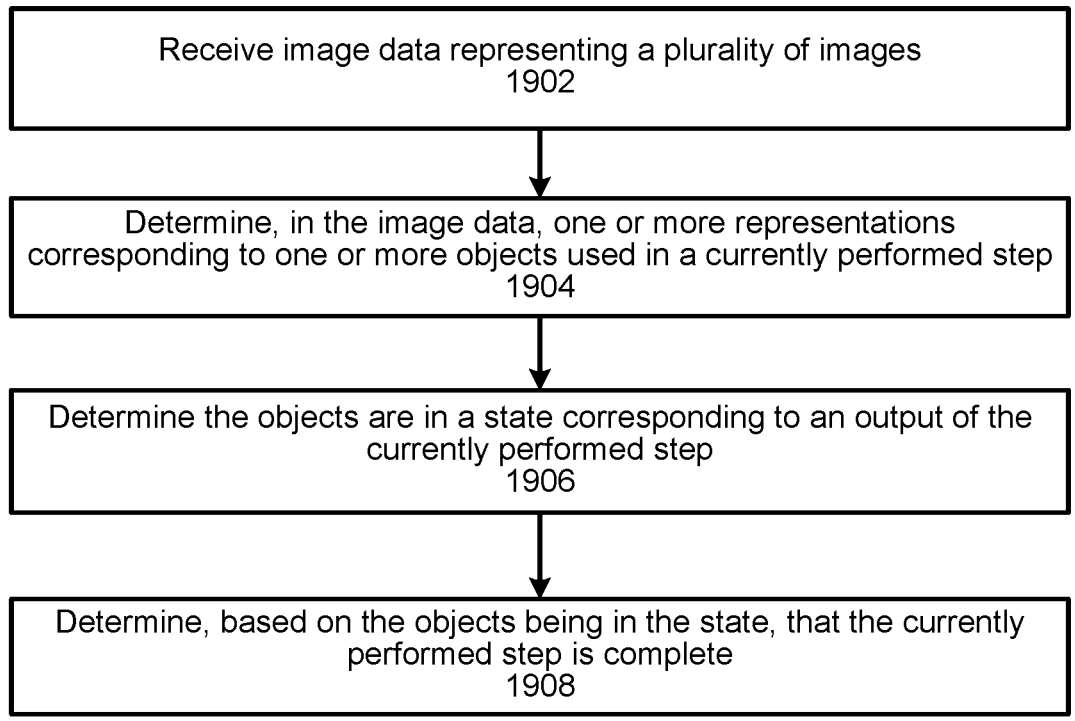
FIG. 19 is a process flow diagram illustrating a method for determining when a step is complete based on image data according to embodiments of the present disclosure.

FIG. 19 illustrates a method for determining when a step is complete based on image data. The system receives (1902) image data representing a plurality of images. The system processes the image data to determine (1904) one or more representations corresponding to one or more objects used in a currently performed step. For example, the image data may include representations of raw materials used in currently performed step. At some point in time, processing of the image data may result in a determination (1906) that one or more representations indicate the materials are no longer in their raw state (e.g., the representations correspond to materials in a processed state corresponding to an output state of the currently performed step). Based thereon, the system may determine (1908) that the currently performed step is complete. The system 100 may be configured to prompt the user of such determination. Such prompt may correspond to audio data corresponding to "I noticed your ingredients have been chopped, are you finished with this step."

The teachings of the present disclosure may also be used to parallelize steps of different lists of instructions. For example, a first recipe may involve boiling noodles before any other steps of the first recipe can be performed and a second recipe may involve sautéing chicken before any other steps of the second recipe can be performed. The system may determine boiling of the noodles of the first recipe may be performed in parallel to sautéing of the chicken of the second recipe. The system may then output appropriate information to a user using techniques described herein.

Figure 20:
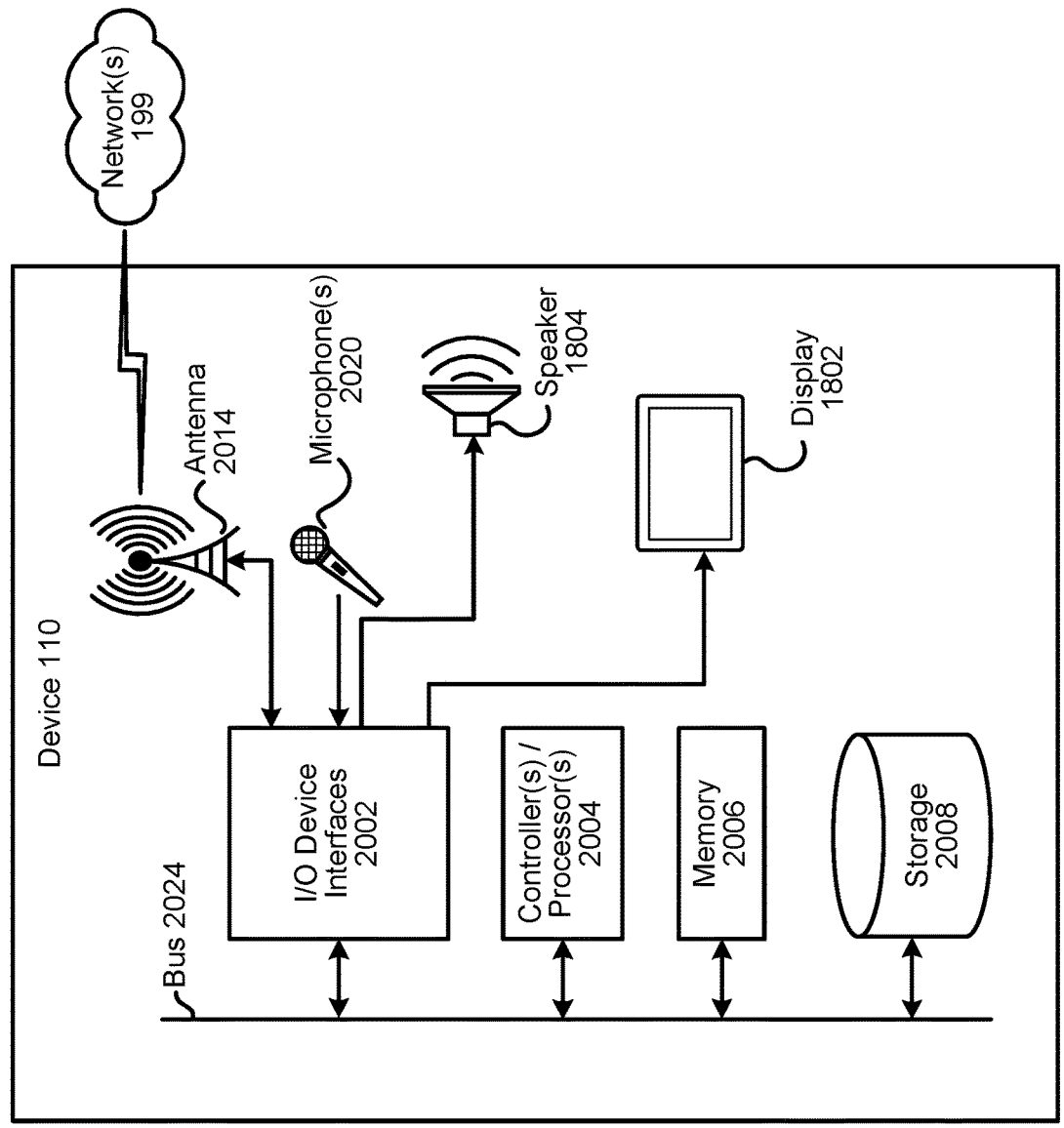
FIG. 20 is a block diagram conceptually illustrating example components of a device according to embodiments of the present disclosure.
Figure 21:
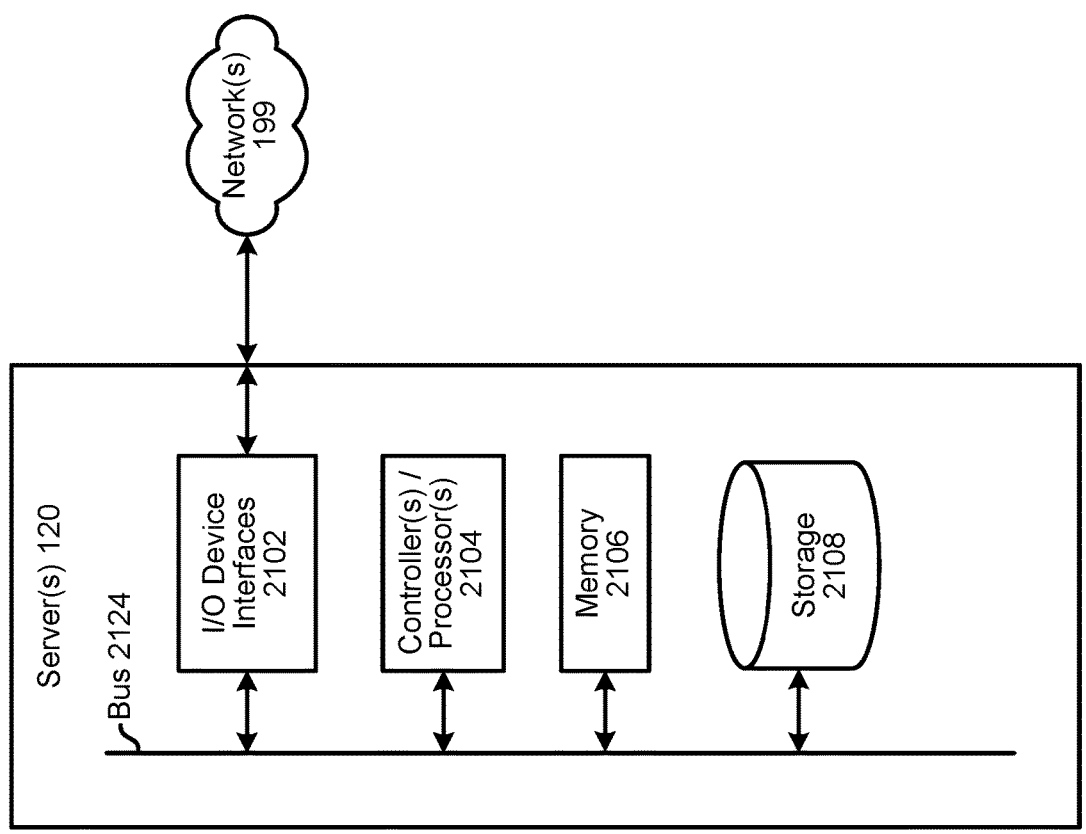
FIG. 21 is a block diagram conceptually illustrating example components of a server according to embodiments of the present disclosure.

FIG. 20 is a block diagram conceptually illustrating a user device 110 that may be used with the described system 100. FIG. 21 is a block diagram conceptually illustrating example components of a remote device, such as the server(s) 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (2004/2104), which may each include a central processing unit (CPU) for processing data and computer-readable instructions, and a memory (2006/2106) for storing data and instructions of the respective device. The memories (2006/2106) may individually include volatile random access memory (RAM), non-volatile read only memory (ROM), non-volatile magnetoresistive memory (MRAM), and/or other types of memory. Each device (110/120) may also include a data storage component (2008/2108) for storing data and controller/processor-executable instructions. Each data storage component (2008/2108) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (2002/2102).

Computer instructions for operating each device (110/120) and its various components may be executed by the respective device's controller(s)/processor(s) (2004/2104), using the memory (2006/2106) as temporary "working" storage at runtime. A device's computer instructions may be stored in a non-transitory manner in non-volatile memory (2006/2106), storage (2008/2108), or an external device(s). Alternatively, some or all of the executable instructions may be embedded in hardware or firmware on the respective device in addition to or instead of software.

Each device (110/120) includes input/output device interfaces (2002/2102). A variety of components may be connected through the input/output device interfaces (2002/2102), as will be discussed further below. Additionally, each device (110/120) may include an address/data bus (2024/2124) for conveying data among components of the respective device. Each component within a device (110/120) may also be directly connected to other components in addition to (or instead of) being connected to other components across the bus (2024/2124).

Referring to FIG. 20, the device 110 may include input/output device interfaces 2002 that connect to a variety of components such as an audio output component such as a speaker 1804, a wired headset or a wireless headset (not illustrated), or other component capable of outputting audio. The device 110 may also include an audio capture component. The audio capture component may be, for example, a microphone 2020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may further include a display 1802 configured to display content.

Via antenna(s) 2014, the input/output device interfaces 2002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment. The I/O device interface (2002/2102) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interface (2002/2102), processor(s) (2004/2104), memory (2006/2106), and/or storage (2008/2108) of the device(s) 110 and server(s) 120, respectively. Thus, ASR component 250 may have its own I/O interface, processor, memory, and/or storage, NLU component 260 may have its own I/O interface, processor, memory, and/or storage, and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as illustrated in FIGS. 20 and 21, are exemplary, and may be located as a stand-alone device or may be included, in whole or in part, as a component of a larger device or system.

Figure 22:
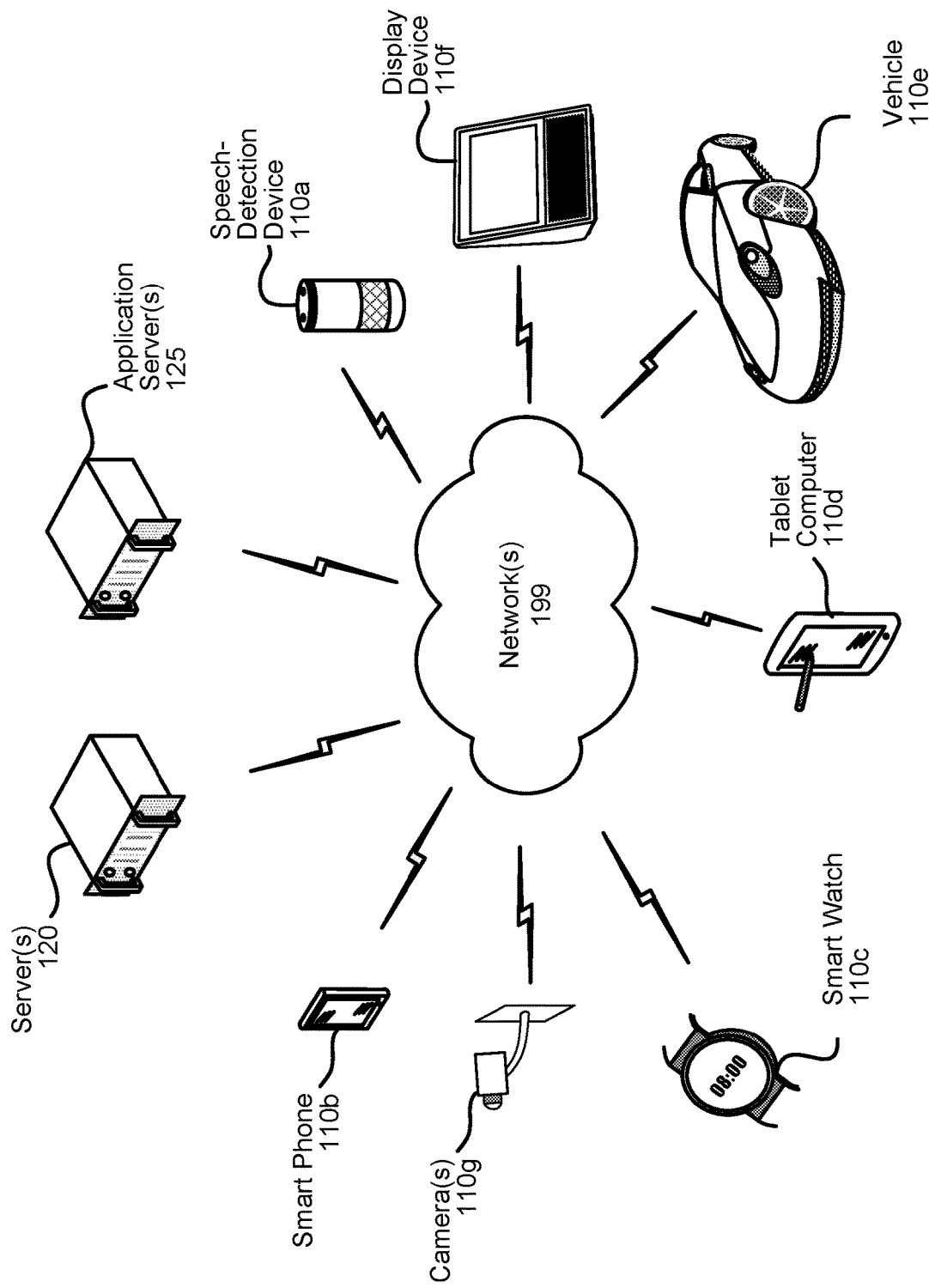
FIG. 22 illustrates an example of a computer network for use with the system.

As illustrated in FIG. 22, multiple devices (110a-110g, 120, 125) may contain components of the system 100 and the devices may be connected over a network(s) 199. The network(s) 199 may include a local or private network or may include a wide network such as the Internet. Devices may be connected to the network(s) 199 through either wired or wireless connections. For example, the speech-detection device 110, a smart phone 110b, a smart watch 110c, a tablet computer 110d, a vehicle 110e, a display device 110f, and/or a camera(s) 110g may be connected to the network(s) 199 through a wireless service provider, over a WiFi or cellular network connection, or the like. Other devices are included as network-connected support devices, such as the server(s) 120, the application server(s) 125, or others. The support devices may connect to the network(s) 199 through a wired connection or wireless connection. Networked devices may capture audio using one-or-more built-in or connected microphones or other audio capture devices, with processing performed by ASR, NLU, or other components of the same device or another device connected via the network(s) 199, such as the ASR component 250, the NLU component 260, etc. of one or more servers 120. Other devices may also be connected to the system such as camera(s) or other user identification components, etc.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 220, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a device, input audio data corresponding to an utterance;
   performing speech processing on the input audio data to determine an intent to output a recipe;
   determining a remote device corresponding to recipe storage;
   determining a user profile associated with the device;
   sending, to the remote device, a signal requesting text data corresponding to the recipe;
   receiving, from the remote device, instruction text data corresponding to the recipe;
   determining text in the instruction text data corresponding to a plurality of steps;
   determining text in the instruction text data corresponding to a predefined word indicating parallelization is possible;
   determining that the predefined word is associated with a first step and a second step of the plurality of steps;
   determining the user profile indicates user profile data associated with a preference for summary information;
   generating, based on the user profile data and the instruction text data, output text data including an indication that the first step and the second step are performable in at least partially parallel;
   performing text-to-speech (TTS) processing on the output text data to generate output audio data; and
   causing the device, to emit the output audio data.

2. The computer-implemented method of claim 1, further comprising:
   generating first text indicating steps of the recipe may be performed in parallel;
   generating second text corresponding to the first step;
   generating third text corresponding to the second step; and
   concatenating the first text, the second text, and the third text to generate the output text data.

3. The computer-implemented method of claim 1, further comprising:
   determining the text in the instruction text data corresponding to a third step;
   determining the text corresponding to the third step includes a punctuation mark;
   determining first text ending with the punctuation mark, the first text corresponding to a first substep;

determining second text starting proximate to the punctuation mark, the second text corresponding to a second substep;

generating second output text data indicating the first substep and the second substep are performable in parallel;

performing TTS processing on the second output text data to generate second output audio data; and causing the device to emit the second output audio data.

4. The computer-implemented method of claim 1, further comprising:

determining the text in the instruction text data corresponding to a third step;

determining the text corresponding to the third step includes a first verb and a second verb;

determining first text associated with the first verb, the first text corresponding to a first substep;

determining second text associated with the second verb, the second text corresponding to a second substep;

generating second output text data indicating the first substep and the second substep are performable in parallel;

performing TTS processing on the second output text data to generate second output audio data; and causing the device to emit the second output audio data.

5. A system comprising:

at least one processor; and at least one memory including instructions that, when executed by the at least one processor, cause the system to:

receive instruction text data representing text corresponding to instructions, the text being formatted for visual presentation;

determine that a first step and a second step represented in the instruction text data are performable at least partially in parallel;

determine a user profile associated with a voice user interface (VUI);

generate, based on the user profile and the instruction text data, metadata associated with first text corresponding to the first step and second text corresponding to the second step;

determine the user profile indicates user profile data associated with a preference for summary information; and cause the VUI to output an indication, based on the metadata and the user profile data, that the first step and the second step are performable at least partially in parallel.

6. The system of claim 5, wherein the instructions, when executed by the at least one processor, causing the system to determine the first step and the second step are performable at least partially in parallel further cause the system to:

determine a predefined word represented in the instruction text data, the predefined word indicating parallelization is possible; and determine the first step and the second step are associated with the predefined word.

7. The system of claim 5, wherein the instructions, when executed by the at least one processor, causing the system to determine the first step and the second step are performable at least partially in parallel further cause the system to:

receive input audio data corresponding to an utterance;

perform speech processing on the input audio data to determine that at least two users will perform steps represented in the instruction text data; and determine, based on the at least two users performing the steps, that the first step and the second step are performable at least partially in parallel.

8. The system of claim 5, wherein the instructions, when executed by the at least one processor, causing the system to determine the first step and the second step are performable at least partially in parallel further cause the system to:

generate third text indicating steps of the instruction text data may be performed in parallel;

generate fourth text corresponding to the first step;

generate fifth text corresponding to the second step; and concatenate the third text, the fourth text, and the fifth text to generate the output text data.

9. The system of claim 5, wherein the at least one memory further comprises instructions that, when executed by the at least one processor, further cause the system to:

determine a third step represented in the instruction text data is performed using a second device;

determine a parameter associated with the third step; and generate output audio data requesting whether the second device should be operated according to the parameter.

10. The system of claim 5, wherein the instructions, when executed by the at least one processor, causing the system to determine the first step and the second step are performable at least partially in parallel further cause the system to:

determine a third step and a fourth step represented in the instruction text data;

determine at least one first input material associated with the third step;

determine at least one second input material associated with the fourth step;

determine at least one first output material associated with the third step;

determine at least one second output material associated with the fourth step; and generate a tree structure based on the at least one first input material, the at least one second input material, the at least one first output material, and the at least one second output material.

11. The system of claim 5, wherein the at least one memory further comprises instructions that, when executed by the at least one processor, further cause the system to:

determine a third step represented in the instruction text data that includes a punctuation mark;

determine a first substep of the third step, the first substep ending with the punctuation mark;

determine a second substep of the third step, the second substep starting with the punctuation mark; and generate second metadata causing the VUI to indicate the first substep and the second substep are performable in parallel.

12. The system of claim 5, wherein the at least one memory further comprises instructions that, when executed by the at least one processor, further cause the system to:

determine a third step represented in the instruction text data that includes an amount of time; and generate output data requesting whether a timer should be prepared according to the amount.

13. The system of claim 5, wherein the at least one memory further comprises instructions that, when executed by the at least one processor, further cause the system to:

determine, using a trained model, that the first step and the second step are performable at least partially in parallel.

14. The system of claim 5, wherein the instructions, when executed by the at least one processor, causing the system to generate metadata further cause the system to:
- determine the user profile indicates second user profile data associated with a second preference for data corresponding to a type of equipment; and
- determine the output indication based at least in part on the second user profile data.

15. The system of claim 5, wherein the instructions, when executed by the at least one processor, causing the system to generate metadata further cause the system to:
- determine the user profile includes data representing a calendar entry; and
- determine the output indication based at least in part on a period of time associated with the calendar entry.

16. The system of claim 5, wherein the instructions, when executed by the at least one processor, causing the system to generate metadata further cause the system to:
- determine the first text represents a first ingredient;
- determine the user profile indicates a second preference for data representing a second ingredient as a substitute for the first ingredient; and
- generate, based on the user profile and the instruction text data, metadata that represents the second ingredient and not the first ingredient.

17. A computer-implemented method comprising:
- receiving instruction text data representing text corresponding to instruction, the text being formatted for visual presentation;
- determining that a first step and a second step represented in the instruction text data are performable at least partially in parallel;
- determining a user profile associated with a voice user interface (VUI);
- generating, based on the user profile and the instruction text data, metadata associated with first text corresponding to the first step and second text corresponding to the second step;
- determining the user profile indicates user profile data associated with a preference for summary information; and
- causing the VUI to output an indication, based on the metadata and the user profile data, that the first step and the second step are performable at least partially in parallel.

18. The computer-implemented method of claim 17, wherein determining the first step and the second step are performable at least partially in parallel comprises:
- determining a predefined word represented in the instruction text data, the predefined word indicating parallelization is possible; and
- determining the first step and the second step are associated with the predefined word.

19. The computer-implemented method of claim 17, wherein determining the first step and the second step are performable at least partially in parallel comprises:
- receiving input audio data corresponding to an utterance;
- performing speech processing on the input audio data to determine that at least two users will perform steps represented in the instruction text data; and
- determining, based on the at least two users performing the steps, that the first step and the second step are performable at least partially in parallel.

20. The computer-implemented method of claim 17, wherein determining the first step and the second step are performable at least partially in parallel comprises:
- generating third text indicating steps of the instruction text data may be performed in parallel;
- generating fourth text corresponding to the first step;
- generating fifth text corresponding to the second step; and
- concatenating the third text, the fourth text, and the fifth text to generate the output text data.

21. The computer-implemented method of claim 17, further comprising:
- determining a third step represented in the instruction text data is performed using a second device;
- determining a parameter associated with the third step; and
- generating output audio data requesting whether the second device should be operated according to the parameter.

22. The computer-implemented method of claim 17, wherein determining the first step and the second step are performable at least partially in parallel comprises:
- determining a third step and a fourth step represented in the instruction text data;
- determining at least one first input material associated with the third step;
- determining at least one second input material associated with the fourth step;
- determining at least one first output material associated with the third step;
- determining at least one second output material associated with the fourth step; and
- generating a tree structure based on the at least one first input material, the at least one second input material, the at least one first output material, and the at least one second output material.

23. The computer-implemented method of claim 17, further comprising:
- determining a third step represented in the instruction text data that includes a punctuation mark;
- determining a first substep of the third step, the first substep ending with the punctuation mark;
- determining a second substep of the third step, the second substep starting with the punctuation mark; and
- generating second metadata causing the VUI to indicate the first substep and the second substep are performable in parallel.

24. The computer-implemented method of claim 17, further comprising:
- determining a third step represented in the instruction text data includes an amount of time; and
- generating output data requesting whether a timer should be prepared according to the amount.

25. The computer-implemented method of claim 17, further comprising:
- determining, using a trained model, that the first step and the second step are performable at least partially in parallel.

* * * * *